United States Patent
Seguchi et al.

(10) Patent No.: US 11,015,075 B2
(45) Date of Patent: May 25, 2021

(54) INK SET AND RECORDING METHOD

(71) Applicant: Seiko Epson Corporation, Tokyo (JP)

(72) Inventors: Kenichi Seguchi, Okaya (JP); Mitsuaki Kosaka, Minowa (JP)

(73) Assignee: Seiko Epson Corporation ( * ) Notice: Subject to any disclaimer, the term of this patent is extended or adjusted under 35 U.S.C. 154(b) by 0 days.

(21) Appl. No.: 16/361,369

(22) Filed: Mar. 22, 2019

(65) Prior Publication Data
US 2019/0292391 A1 Sep. 26, 2019

(30) Foreign Application Priority Data

Mar. 23, 2018 (JP) .............................. JP2018-056403

(51) Int. Cl.
| | |
|---|---|
| B41J 2/21 | (2006.01) |
| C09D 11/40 | (2014.01) |
| C09D 11/10 | (2014.01) |
| B41M 5/00 | (2006.01) |
| B41M 7/00 | (2006.01) |
| C09D 11/033 | (2014.01) |
| C09D 11/037 | (2014.01) |
| C09D 11/107 | (2014.01) |
| C09D 11/322 | (2014.01) |
| C09D 11/38 | (2014.01) |
| C09D 11/54 | (2014.01) |

(52) U.S. Cl.
CPC ........... *C09D 11/40* (2013.01); *B41M 5/0023* (2013.01); *B41M 7/009* (2013.01); *C09D 11/033* (2013.01); *C09D 11/037* (2013.01); *C09D 11/107* (2013.01); *C09D 11/322* (2013.01); *C09D 11/38* (2013.01); *C09D 11/54* (2013.01)

(58) Field of Classification Search
CPC ........ B41J 2/2107; B41J 2/2114; B41J 2/211; B41J 2/2117; C09D 11/54; C09D 11/102; C09D 11/106; C09D 11/322; C09D 11/38; C09D 11/40; C09D 11/326; B41M 5/0017

See application file for complete search history.

(56) References Cited

U.S. PATENT DOCUMENTS

| | | |
|---|---|---|
| 2003/0007051 A1 | 1/2003 | Takahashi et al. |
| 2010/0201736 A1 | 8/2010 | Ooishi et al. |
| 2011/0057987 A1* | 3/2011 | Inushima ............... C09D 11/40 347/21 |
| 2011/0069109 A1 | 3/2011 | Tojo |
| 2017/0232763 A1* | 8/2017 | Okuda ................. C09D 11/108 347/21 |
| 2017/0283639 A1 | 10/2017 | Seguchi et al. |

FOREIGN PATENT DOCUMENTS

| | | |
|---|---|---|
| EP | 2 623 330 A1 | 8/2013 |
| EP | 3 461 866 A1 | 4/2019 |
| JP | 2010-115854 A | 5/2010 |
| JP | 2017-186442 A | 10/2017 |

OTHER PUBLICATIONS

Extended European Search Report for Application No. EP 19 16 4662 dated Aug. 16, 2019 (6 pages).

* cited by examiner

*Primary Examiner* — Jason S Uhlenhake

(74) *Attorney, Agent, or Firm* — Harness, Dickey & Pierce, P.L.C.

(57) ABSTRACT

An ink set includes a first ink and a second ink which are water-based ink compositions, in which each of the first ink and the second ink includes a pigment and resin including resin particles, the first ink includes a first pigment and the second ink includes a second pigment different from the first pigment, the first ink and the second ink are mixed with a 5% by mass water-based solution of magnesium sulfate heptahydrate to increase a volume average particle diameter of the ink and a difference in the volume average particle diameter for the inks in the inks after mixing is 40% or less, and the ink set is used for recording together with a treatment liquid including an aggregating agent for aggregating the components of the water-based ink compositions.

14 Claims, No Drawings

INK SET AND RECORDING METHOD

BACKGROUND

1. Technical Field

The present invention relates to an ink set and a recording method.

2. Related Art

In the ink jet recording method, small droplets of an ink composition are ejected from fine nozzles and are attached to a recording medium to perform recording. This method is able to record high resolution and high-quality images at a high speed with a relatively inexpensive apparatus.

In recent years, studies have been carried out on the recording of labels or the like for products on soft packaging films such as PET films using an ink jet recording method. In addition, studies have been carried out on the recording of sign prints for display, product labels, and the like on films such as PVC films using an ink jet recording method. Studies have also been carried out on the recording of printed matter on printing coated paper using an ink jet recording method.

JP-A-2010-115854 discloses a water-based ink set including color inks, resin inks, and reactive inks. JP-A-2010-115854 describes that it is possible to improve the printing speed, coloring property, and the like by aggregating the components of the color ink and the resin ink using a reactive ink.

However, when an image is recorded using a plurality of color inks, images having different gloss in each portion where each color ink is attached may be obtained. In such an image, since the reflection of light differs from color to color, flaws may be perceived depending on the viewing angle. Therefore, in ink sets provided with inks of a plurality of colors, there is a demand to reduce the difference in the gloss of the images formed with the inks of various colors.

SUMMARY

Application Example 1

According to an aspect of the invention, there is provided an ink set including a first ink and a second ink which are water-based ink compositions, in which the first ink and the second ink include a pigment and resin including resin particles, the first ink includes a first pigment and the second ink includes a second pigment different from the first pigment, the first ink and the second ink are mixed with a 5% by mass water-based solution of magnesium sulfate heptahydrate to increase a volume average particle diameter of the inks and a difference in the volume average particle diameter for the inks in the inks after mixing is 40% or less, and the ink set may be used for recording together with a treatment liquid including an aggregating agent for aggregating the components of the water-based ink compositions.

Application Example 2

In the ink set according to Application Example 1, each of the first ink and the second ink may include 150 parts by mass or more of the resin with respect to 100 parts by mass of the contained pigments.

Application Example 3

The ink set according to Application Example 1 or Application Example 2 may further include a third ink which is a water-based ink composition containing a third pigment which is a pigment different from the first pigment and the second pigment, and a resin including resin particles, in which the first ink, the second ink, and third ink may be mixed with a 5% by mass water-based solution of magnesium sulfate heptahydrate to increase a volume average particle diameter of the inks and a difference in the volume average particle diameter for the inks in the inks after mixing may be 40% or less.

Application Example 4

In the ink set according to any one of Application Example 1 to Application Example 3, the first ink and the second ink may have a volume average particle diameter increase rate of 400% or less after mixing the contained resin particles with a 5% by mass water-based solution of magnesium sulfate heptahydrate, with respect to before mixing.

Application Example 5

In the ink set according to any one of Application Example 1 to Application Example 4, a content of the pigment in each of the first ink and the second ink may be 1% by mass or more.

Application Example 6

In the ink set according to any one of Application Example 1 to Application Example 5, the treatment liquid may include, as an aggregating agent, one or more types of a polyvalent metal salt, a cationic resin, and an organic acid.

Application Example 7

In the ink set according to any one of Application Example 1 to Application Example 6, the first ink and the second ink may each include a nitrogen-containing solvent.

Application Example 8

According to another aspect of the invention, there is provided a recording method using the ink set according to any one of Application Example 1 to Application Example 7, the method including attaching the treatment liquid to a recording medium, attaching the first ink to the recording medium, and attaching the second ink to the recording medium.

Application Example 9

According to still another aspect of the invention, there is provided a recording method performed using a first ink and a second ink which are water-based ink compositions, and a treatment liquid, in which the first ink and the second ink contain a pigment and resin particles, the first ink contains a first pigment and the second ink contains a second pigment different from the first pigment, and the first ink and the second ink are mixed with a treatment liquid to increase a volume average particle diameter of the ink and a difference in the volume average particle diameters for the inks in the inks after mixing is 40% or less, the method including attaching the treatment liquid to a recording medium, attaching the first ink to the recording medium, and attaching the second ink to the recording medium.

Application Example 10

The recording method according to Application Example 8 or Application Example 9 may further include post-heating the recording medium to which the treatment liquid, the first ink, and the second ink are attached.

Application Example 11

In the recording method according to Application Example 8 or Application Example 9, the recording medium may be a low-absorption recording medium or a non-absorption recording medium.

Application Example 12

In the recording method according to any one of Application Example 8 to Application Example 11, the first ink and the second ink may be attached to the heated recording medium.

Application Example 13

In the recording method according to any one of Application Example 8 to Application Example 11, a region of the recording medium to which the treatment liquid and the ink are attached may include a region in which an attachment amount of the treatment liquid is 5% by mass or more and 20% by mass or less with respect to an attachment amount of the ink.

Application Example 14

In the recording method according to any one of Application Example 8 to Application Example 13, the first ink and the second ink may be ejected from an ink jet head and attached to the recording medium.

DESCRIPTION OF EXEMPLARY EMBODIMENTS

Several embodiments of the invention will be described below. The embodiments described below explain one example of the invention. The invention is not limited to the following embodiments at all, and includes various modifications carried out without departing from the gist of the invention. Note that not all of the configurations described below are necessarily indispensable components of the invention.

1. Ink Set

The ink set according to the present embodiment includes two or more inks, and all the inks are water-based ink compositions. In the present specification, one of a plurality of inks included in the ink set may be referred to as a first ink, and one of the other inks may be referred to as a second ink. In addition, in a case where inks other than the first ink and the second ink are included, one thereof may be referred to as a third ink. That is, the ink set according to the present embodiment is provided with at least a first ink and a second ink which are water-based ink compositions. Then, the ink set is used for recording together with a treatment liquid including an aggregating agent for aggregating the components of the water-based ink compositions.

Each ink included in the ink set of the present embodiment includes a pigment and a resin including resin particles. In addition, the pigments contained in each ink are different from each other at least. Therefore, a description will be given below of the inks first, and then a description will be given of the combinations and names of a plurality of inks.

1.1. Ink

The ink included in the ink set of the present embodiment is a water-based ink composition, and includes a pigment and a resin including resin particles. A water-based ink composition is a composition including water as one of the main solvent components. Water may be included as the main solvent component of the water-based ink composition and is a component which is evaporated and scattered by drying. The water is preferably water obtained by removing ionic impurities as much as possible such as pure water or ultrapure water such as ion exchanged water, ultra-filtered water, reverse osmosis water, or distilled water. In addition, using water sterilized by addition of UV irradiation, hydrogen oxide, or the like makes it possible to suppress the generation of mold and bacteria in a case where the ink is stored for a long time, which is good. The content of water is preferably 45% by mass or more with respect to the total amount of the water-based ink composition, more preferably 50% by mass or more and 98% by mass or less, and even more preferably 55% by mass or more and 95% by mass or less.

Volume Average Particle Diameter after Ink Mixing

The ink included in the ink set of the present embodiment includes components which are aggregated by mixing with an aggregating agent to be described below. Examples of the aggregating components include a pigment (in a case of including a resin dispersant, together with the resin dispersant), resin particles, and the like. It is possible to confirm the aggregation of the components of the ink by mixing with a test liquid or a treatment liquid.

Specifically, as a test liquid, a 5% by mass water-based solution of magnesium sulfate heptahydrate is used. The ink and the test liquid are mixed at a ratio such that the ratio of the solid content in the ink to the solid content (including hydration water) of the aggregating agent (magnesium sulfate) of the test liquid is a mass ratio of 4:1 (solid content of ink: solid content of aggregating agent). After stirring the mixture slowly at room temperature for 10 minutes and leaving the result to stand for 1 hour, the result is diluted with pure water such that the total solid content becomes 0.01%. The volume average particle diameter (D50) thereof is measured by a dynamic light scattering method. For example, it is possible to obtain the value of the volume average particle diameter D50 (median diameter) after aggregation by obtaining an average value by measuring three times with a Nanotrac UPA-150 (manufactured by Nikkiso Co., Ltd.). The solid content in the ink is a solid component and simple substance such as a coloring material and a resin at room temperature. A 5% by mass water-based solution of magnesium sulfate heptahydrate is referred to as a test liquid. The volume average particle diameter of the ink is the volume average particle diameter of the components (particles) in the entirety of the ink which have a particle diameter among the components included in the ink. Examples of the particles include pigments, resin particles, and the like.

The volume average particle diameter D50 after mixing the ink is not limited, but is preferably 50 nm or more, more preferably 100 nm or more, and even more preferably 150 nm or more. Although the upper limit is not limited, the upper limit is preferably 3000 nm or less, more preferably 2000 nm or less, even more preferably 1000 nm or less, still more preferably 500 nm or less, and particularly preferably 300 nm or less. In the case of the above range, the gloss of the image is superior, which is preferable in terms of the ease of matching the gloss difference.

Further, by diluting the ink with pure water such that the solid content of the ink becomes 0.01% and measuring the result in the same manner as above, it is possible to obtain the volume average particle diameter of the ink before mixing. Then, it is possible to determine the increase rate in the volume average particle diameter before and after the ink mixing by the following formula as the degree of aggregation (%) of the ink.

Degree of aggregation (%)={($D$50after aggregation)−($D$50before aggregation)}/($D$50before aggregation)×100

The degree of aggregation (increase rate) of the ink is preferably 1% or more, more preferably 5% or more, even more preferably 50% or more, still more preferably 70% or more, and particularly preferably 100% or more. Although the upper limit is not limited, the upper limit is preferably 3000% or less, more preferably 2000% or less, even more preferably 1000% or less, still more preferably 500% or less, and particularly preferably 300% or less. At least one of the degree of aggregation of the first ink and the degree of aggregation of the second ink may be in the above range, and both may be in the above range.

The volume average particle diameter of the ink before mixing (before aggregation) is not limited but is preferably 50 to 300 nm, and more preferably 100 to 200 nm. The above range is preferable from the viewpoint that the design of the ink is easy.

In a case where the degree of aggregation of the ink is in the above range or more, the ink aggregates well with the treatment liquid in recording, ink bleeding is suppressed, the image quality is excellent, and the OD value is also excellent, which is preferable. In a case where the degree of aggregation of the ink is in the above range or less, the gloss of the image is excellent and it is easy to reduce the gloss difference, which is preferable.

In addition, the degree of aggregation of the first ink and the degree of aggregation of the second ink may be different, and in a case of being different from each other, it is easy to design the ink composition according to the functions such that the color to be colored, the kind of components to be used, and the like are different for each ink, which is preferable. The difference between the degree of aggregation of the first ink and the degree of aggregation of the second ink is preferably 5 or more, more preferably 10 or more, and more preferably 50 or more, in terms of the above point. In addition, although the upper limit of the difference is not limited, the upper limit is preferably 700 or less, more preferably 500 or less, even more preferably 200 or less, and particularly preferably 100 or less in terms of easy reduction of the gloss difference.

In addition, the aggregation property of the components of the ink may be confirmed by mixing with a treatment liquid described below. That is, instead of the test liquid described above, it is possible to carry out the measurement and evaluation in the same manner as described above using a treatment liquid described below used for recording. Also, in this case, in a case where the aggregating agent included in the treatment liquid is a hydrate, hydration water is also included in the solid content.

Difference in Volume Average Particle Diameter after Mixing of Inks of Ink Set

The first ink and the second ink are each mixed with an aggregating agent to aggregate the components. The difference in the volume average particle diameter (D50) of the inks after mixing is 40% or less. The difference in average particle diameter is a value (%) obtained by dividing a difference obtained by subtracting the smaller one of the average particle diameters of the ink from the larger average particle diameter by the larger average particle diameter and multiplying the result by 100. The formula is as follows.

Difference (%) of volume average particle diameter after mixing=$a$(Max($D$50after mixing)−Min($D$50after mixing))/Max($D$50after mixing)×100

Setting the difference between the volume average particle diameters of the first ink and the second ink after mixing to 40% or less reduces the difference in gloss of each portion of the image to be recorded using the ink set, thus, it is possible to record images with fewer perceived flaws such as partially different gloss levels. In addition, the difference in the volume average particle diameter (D50) between the first ink and the second ink after aggregation is more preferably 30% or less from the viewpoint of being able to further reduce the gloss difference in the image to be formed, even more preferably 20% or less, and particularly preferably 10% or less. The lower limit of the difference is 0% or more.

It is possible to relatively reduce the difference in the volume average particle diameter after mixing the inks of the ink set by setting the volume average particle diameter of the first ink and the second ink after aggregation to be relatively close to each other. In order to do this, the volume average particle diameter after mixing each ink may be adjusted to be large or small. The volume average particle diameter after mixing the inks is measured as the volume average particle diameter of all of the components having a particle diameter included in the ink. Therefore, it is possible to adjust the volume average particle diameter after mixing the inks by selecting the type of the component, adjusting the blend amount, and the like while paying attention to the volume average particle diameter after mixing the components having a particle diameter included in the ink. Examples of components having a particle diameter include pigments and resin particles. In this manner, the volume average particle diameter after mixing the inks may be confirmed by measuring with the above measuring method.

1.1.1. Resin Particles

The ink of the present embodiment includes resin particles. The resin particles have a function as a so-called fixing resin which improves the adhesion of ink attached to the recording medium. Examples of such resin particles include urethane-based resins, acrylic-based resins, styrene acrylic-based resins, fluorene-based resins, polyolefin-based resins, rosin modified-based resins, terpene-based resins, polyester-based resins, polyamide-based resins, epoxy-based resins, vinyl chloride-based resins, vinyl chloride-vinyl acetate copolymers, ethylene vinyl acetate-based resins, and the like. These resin particles are often handled in the form of an emulsion, but may be in the form of a powder. In addition, the resin particles may be used alone or in a combination of two or more types thereof.

Urethane-based resin is a general term for resins having urethane bonds. Urethane-based resins which may be used include a polyether type urethane resin including an ether bond in the main chain in addition to the urethane bond, a polyester type urethane resin including an ester bond in the main chain, a polycarbonate type urethane resin including a carbonate bond in the main chain, and the like.

Acrylic-based resin is a general term for polymers obtained by polymerizing acrylic-based monomers such as (meth)acrylic acid and (meth)acrylic acid ester as at least one component, and examples thereof include resins obtained from acrylic-based monomers, copolymers of acrylic-based monomers and monomers other than the above, and the like. Examples thereof include acrylic-vinyl-based resins which are copolymers of an acrylic-based monomer and a vinyl-based monomer, and the like. Furthermore, examples thereof include copolymers with vinyl-based monomers such as styrene.

As the acrylic-based monomer, it is also possible to use acrylamide, acrylonitrile, and the like. Commercial products may be used as a resin emulsion with an acrylic-based resin as a raw material. In this specification, the acrylic-based resin may be a styrene acrylic-based resin described below. In the present specification, the expression (meth)acrylic means at least one of acrylic and methacrylic.

The styrene acrylic-based resin is a copolymer obtained from a styrene monomer and an acrylic-based monomer and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, and the like. A commercially available product may be used for the styrene acrylic-based resin.

The polyolefin-based resin has an olefin such as ethylene, propylene, or butylene in the structural skeleton thereof, and it is possible to appropriately select and use known resins. As the olefin resin, a commercially available product may be used.

Examples of commercially available resin particle emulsions able to be used in the present embodiment are described below.

Styrene Acrylic-Based Resin Emulsion

Microgel E-1002 and E-5002 (product names, manufactured by Nippon Paint Co., Ltd.), Voncoat 5454 (product name, manufactured by DIC Corp.), Polysol AP-7020, and SAE 1014 (product names, manufactured by Showa Denko K.K.), Vinyblan 2586 (product name, manufactured by Nissin Chemical Co., Ltd.), Arrowbase CB-1200 and CD-1200 (product names, manufactured by Unitika Ltd.), Mowinyl 966A, 7320, and 975N (product names, manufactured by Nippon Synthetic Chemical Industry Co., Ltd.), Joncryl 62J, 7100, 390, 711, 511, 7001, 632, 741, 450, 840, 74J, HRC-1645J, 734, 852, 7600, 775, 537 J, 1535, PDX-7630 A, 352 J, 352 D, PDX-7145, 538 J, 7640, 7641, 631, 790, 780, and 7610 (product names, manufactured by BASF).

Acrylic-Based Resin Emulsion

Voncoat 4001 (product name, manufactured by DIC Corp.), Polyol AM-710, AM-920, AM-2300, AP-4735, AT-860, and PSASE-4210E (product names, manufactured by Showa Denko K.K.), Saivinol SK-200 (product name, manufactured by Saiden Chemical Industry Co., Ltd.), AE-120A (product name, manufactured by JSR Corp.), Vinyblan 2682 (product name, manufactured by Nissin Chemical Co., Ltd.), Mowinyl 952B, and 718A (product names, manufactured by Nippon Synthetic Chemical Industry Co., Ltd.), K-854 (product name, manufactured by Chuorika Co., Ltd.), and NipolLX 852 and LX 874 (product names, manufactured by Zeon Corp.).

Urethane-Based Resin Emulsion

Superflex 870, 800, 150, 420, 460, 470, 610, 700, 460s, 840, and E-4000 (product names, manufactured by DKS Co., Ltd.), Permarin UA-150 (product name, manufactured by Sanyo Chemical Industries, Ltd.), SUNCURE 2710 (product name, manufactured by Japan Lubrizol Corp.), NeoRez R-9660, R-9637, and R-940 (product names, manufactured by Kusumoto Chemicals Ltd.), Adeka Bontighter HUX-380 and 290K (product names, manufactured by ADEKA CORP.), Resamine D-1060, D-2020, D-4080, D-4200, D-6300, and D-6455 (product names, manufactured by Dainichiseika Color & Chemicals Mfg. Co., Ltd.), and Takelac W-6020, W-635, W-6061, W-605, W-635, W-6021, and W-512-A-6 (product names, manufactured by Mitsui Chemical Polyurethane Co., Ltd.).

Other Resin Emulsions

Elitel KA-5071 S, KT-8803, KT-9204, KT-8701, KT-8904, and KT-0507 (product names, manufactured by Unitika Ltd., polyester resin emulsion), High-tech SN-2002 (product name, manufactured by Toho Chemical Industry Co., Ltd., polyester resin emulsion), Polysol SH-502 (product name, manufactured by Showa Denko K.K., vinyl acetate resin emulsion), Polysol AD-13, AD-2, AD-10, AD-96, AD-17, and AD-70 (product names, manufactured by Showa Denko K.K., ethylene vinyl acetate resin emulsion), Polysol PSASE-6010 (product name, manufactured by Showa Denko K.K., ethylene vinyl acetate resin emulsion), AE 373 D (product name, manufactured by Etech Co., carboxy modified styrene.acryl resin emulsion), Seikadyne 1900 W (product name, manufactured by Dainichiseika Color & Chemicals Mfg. Co., Ltd., ethylene vinyl acetate resin emulsion), Vinyblan 2886 (product name, manufactured by Nissin Chemical Co., Ltd., vinyl acetate.acryl resin emulsion), Vinyblan 5202 (product name, manufactured by Nissin Chemical Co., Ltd., acetic acid acrylic resin emulsion), NK binder R-5HN (product name, manufactured by Shin-Nakamura Chemical Co., Ltd.), and Hydran WLS-210 (product name, manufactured by DIC Corp., non-crosslinkable polyurethane emulsion).

Physical Properties of Resin Particles

The glass transition temperature (Tg) of the resin particles is preferably −50° C. or higher to 200° C. or lower, more preferably 0° C. or higher to 150° C. or lower, and even more preferably 50° C. or higher to 100° C. or lower. When the glass transition temperature (Tg) of the resin particles is in the above range, the resin particles tend to be superior in durability and clogging resistance. It is possible to measure the glass transition temperature, for example, according to JIS K 7121 (method for measuring the transition temperature of plastics) using a differential scanning calorimeter "DSC 7000" manufactured by Hitachi High-Tech Science Corp.

The volume average particle diameter of the resin particles (before mixing with the aggregating agent) is preferably 10 nm or more and 300 nm or less, more preferably 50 nm or more and 250 nm or less, even more preferably 100 nm or more and 230 nm or less, and particularly preferably 150 nm or more and 210 nm or less. The volume average particle diameter of the resin particles is measured as an initial state by the method of confirming the volume average particle diameter of the resin particles described below. A case where the volume average particle diameter is in the above range is preferable in terms of the easy acquisition of the desired resin particles and easily obtaining preferable resin particle properties.

The content of the resin particles in the ink with respect to the total mass of the ink is 0.1% by mass or more and 20% by mass or less as a solid content, preferably 1% by mass or more and 15% by mass or less, and more preferably 2% by mass or more and 10% by mass or less.

Aggregation Property of Resin Particles

It is possible to measure the ease of aggregation (aggregation property) of the resin particles. The volume average particle diameter of the resin particles is measured in a state in which the resin particles are not blended in the ink. As the resin particles, a water-based medium solution of a resin is used. A water-based dispersion or the like of the resin used for preparing the ink, may be used. A resin emulsion or the like may be used. The resin emulsion and the test liquid were mixed at a ratio such that the mass ratio of the solid content of the resin particles of the resin water-based medium solution with respect to the solid content of the aggregating agent in the test liquid was 4:1 (resin solid content: aggregating agent solid content). The test liquid is a 5% by mass water-based solution of magnesium sulfate heptahydrate.

The mixture is stirred slowly at room temperature for 10 minutes, left for 1 hour, and diluted with pure water such that the total solid content becomes 0.01%. Then the volume average particle diameter of the result is measured. The measurement is carried out in the same manner as the measurement of the volume average particle diameter of the ink after aggregation described below. Measurement is carried out using the D50 (median diameter) based on volume. The 5% by mass water-based solution of magnesium sulfate heptahydrate will be referred to as the test liquid.

It is also possible to measure the volume average particle diameter D50 of the resin before mixing. It is possible to obtain the volume average particle diameter D50 by diluting with pure water such that the solid content of the water-based medium liquid of the resin before mixing becomes 0.01% and measuring the result in the same manner as above. The measurement is performed in the same manner.

The degree of aggregation (%) of the resin particles is the increase rate of the volume average particle diameter before and after mixing and is able to be obtained by the following formula.

$$\text{Degree of aggregation (\%)} = \{(D50\text{after mixing}) - (D50\text{before mixing})\}/(D50\text{before mixing}) \times 100$$

In addition, it is also possible to evaluate the degree of aggregation (%) of the resin particles during mixing of the treatment liquid in the same manner by replacing the test liquid with the treatment liquid used for recording.

The resin particles contained in the first ink and the resin particles contained in the second ink preferably each have a degree of aggregation (increase rate) with an increase rate of 800% or less in a case of being mixed with the test liquid, and more preferably with an increase rate of 400% or less. The increase rate is more preferably 200% or less, even more preferably 100% or less, and particularly preferably 50% or less. In this manner, it may be possible to reduce the gloss difference (gloss unevenness) of the image formed by the first ink and the second ink. The lower limit of the degree of aggregation after mixing may be a lower limit in which the volume average particle diameter does not change before and after mixing, or may be 0% or more. A case where the degree of aggregation of the resin particles is in the above range or less is preferable in that the gloss of the image is excellent, it is easy to reduce the difference in gloss between inks, it is easy to reduce differences in gloss on the recording medium, and it is easy to obtain recorded matter without perceived flaws. A case where the degree of aggregation is the above range or more is preferable in that the ink is favorably aggregated by the treatment liquid in recording to suppress ink bleeding, the image quality is excellent, and the OD value is also excellent.

In addition, it is also possible to measure the degree of aggregation (%) of the resin particles during mixing of the treatment liquid in the same manner as described above using the treatment liquid used in the recording method, instead of the test liquid. In view of the above points, the degree of aggregation of the resin particles during mixing of the treatment liquid is preferably set in the above range. As the treatment liquid, it is possible to use liquids described below.

In a case where resin particles with a relatively small volume average particle diameter increase rate are used as the resin particles included in the ink, a resin which has little aggregation due to the magnesium sulfate included in the test liquid may be used. Examples of such resins include emulsifier dispersion-type resin fine particles. In addition, or alternatively, preferable examples include a resin having a low acid value as measured by a potentiometric method based on JIS-K2501. The acid value is preferably 50 mg KOH/g or less, more preferably 20 mg KOH/g or less, even more preferably 10 mg KOH/g or less, and yet more preferably 5 mg KOH/g or less. The lower limit of the acid value is 0 mg KOH/g or more.

In a case of using emulsifier dispersion-type resin particles, it is preferable to increase the amount of emulsifier used when emulsifying and dispersing using an emulsifier.

On the other hand, in a case where resin particles having a relatively large volume average particle diameter increase rate are used as the resin particles, it is preferable to use a resin having a relatively high acid value as described above, to reduce the amount of the emulsifier used when emulsifying and dispersing, to use self-dispersing resin particles without an emulsifier, or the like.

1.1.2. Pigment

The inks included in the ink set of the present embodiment contain pigments. Examples of pigments able to be used as these pigments include colored pigments such as cyan, yellow, magenta, and black, and special pigments such as white pigments and bright pigments.

Examples of organic pigments include quinacridone-based pigments, quinacridone quinone-based pigments, dioxane-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, thioindigo-based pigments, isoindolinone-based pigments, azomethine-based pigments, dye chelates, dye lakes, nitro-based pigments, nitroso-based pigments, aniline black, and azo-based pigments such as insoluble azo pigments, condensed azo pigments, azo lakes, and chelate azo pigments, and the like.

Specific examples of organic pigments include the following.

Examples of pigments used in a cyan ink include C.I. Pigment Blue 1, 2, 3, 15:3, 15:4, 16, 22, 60, and the like; C.I. Vat Blue 4, 60, and the like, and one selected from a group formed of C.I. Pigment Blue 15:3, 15:4, and 60, or a mixture of two or more types thereof is preferable.

Examples of pigments used in a magenta ink include C.I. Pigment Red 5, 7, 12, 48 (Ca), 48 (Mn), 57 (Ca), 57:1, 112, 122, 123, 168, 184, 202; C.I. Pigment Violet 19 and the like, and one selected from a group formed of C.I. Pigment Red 122, 202, and 209, and C.I. Pigment Violet 19, or a mixture of two or more types thereof is preferable.

Examples of pigments used in a yellow ink include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, 185, and the like, and one selected from a group formed of C.I. Pigment Yellow 74, 109, 110, 128, and 138, or a mixture of two or more types thereof is preferable.

Examples of pigments used in an orange ink include C.I. Pigment Orange 36 or 43 or a mixture thereof.

Examples of pigments used in a green ink include C.I. Pigment Green 7 or 36 or a mixture thereof.

Specific examples of carbon black include furnace black, lamp black, acetylene black, channel black (C.I. Pigment Black 7), and the like, and commercially available products such as No. 2300, 900, MCF88, No. 20B, No. 33, No. 40, No. 45, No. 52, MA7, MA8, MA100, No. 2200B, and the like (product names, manufactured by Mitsubishi Chemical Corp.), Color black FW1, FW2, FW2V, FW18, FW200, 5150, 5160, 5170, Printex 35, U, V, 140U, Special black 6, 5, 4A, 4, 250, and the like (product names, manufactured by Degussa), Conductex SC, Raven 1255, 5750, 5250, 5000, 3500, 1255, 700, and the like (the above are all product names, manufactured by Nippon Carbon Co., Ltd.), Regal 400R, 330R, 660R, Mogul L, Monarch 700, 800, 880, 900, 1000, 1100, 1300, 1400, Elftex 12, and the like (product names, manufactured by Cabot Corp.). These carbon blacks may be used alone or as a mixture of two or more kinds.

The bright pigment is not particularly limited as long as it is able to exhibit brilliance when attached to a medium, and examples thereof include metal particles selected from the group formed of aluminum, silver, gold, platinum, nickel, chromium, tin, zinc, indium, titanium, and copper, or alloys of two or more types thereof (also referred to as metal pigments) or pearl pigments having a pearly gloss. Representative examples of pearl pigments include pigments having pearly gloss and interference gloss such as titanium dioxide-coated mica, fish scale foil, and bismuth oxychloride. In addition, the bright pigment may be subjected to a surface treatment for suppressing a reaction with water.

In addition, examples of white pigments include metal compounds such as metal oxides, barium sulfate, and calcium carbonate. Examples of metal oxides include titanium dioxide, zinc oxide, silica, alumina, magnesium oxide, and the like. In addition, particles having a hollow structure may be used for the white pigment.

These pigments may be used alone or in a combination of two or more types thereof. The pigment is preferably an organic pigment from the viewpoint of storage stability such as light fastness, weather resistance, and gas resistance.

The volume-based average particle diameter (D50) of the pigment (also referred to as "volume average particle diameter") (before mixing the treatment liquid) is preferably 10 nm or more and 200 nm or less, more preferably 30 nm or more and 170 nm or less, even more preferably 50 nm or more and 150 nm or less, and particularly preferably 70 nm or more and 120 nm or less. When the volume average particle diameter is in this range, it is easy to acquire the pigment and to obtain preferable properties. In addition, when the volume average particle diameter of the pigment is in the above range, it is difficult for the pigment particles to settle and it is possible to improve the dispersion stability, in addition, when applied to an ink jet recording apparatus, it is possible to make nozzle clogging and the like less likely to occur. In addition, when the volume average particle diameter of the pigment is in the above range, it is possible to have a sufficiently satisfactory color density in the image.

It is possible to measure the volume average particle diameter of the pigment with a particle size distribution measuring apparatus using the laser diffraction scattering method as the measurement principle. Examples of particle size distribution measuring apparatuses include a particle size distribution meter (for example, "Microtrac UPA" manufactured by Nikkiso Co., Ltd.) using the dynamic light scattering method as the measurement principle.

The pigment is preferably able to stably disperse in the ink. For example, by using ozone, hypochlorous acid, fuming sulfuric acid, or the like, the pigment surface may be oxidized or sulfonated to modify the surface of the pigment particles, such that the pigment may be used as a self-dispersing type pigment or may be used after being dispersed using a resin dispersant.

Examples of resin dispersants include polyvinyl alcohols, polyacrylic acid, acrylic acid-acrylonitrile copolymers, vinyl acetate-acrylate ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methyl styrene-acrylic acid copolymers, styrene-α-methyl styrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and the like and salts thereof.

Preferable among these are a copolymer of a monomer having a hydrophobic functional group and a monomer having a hydrophilic functional group, and a polymer formed of a monomer having both a hydrophobic functional group and a hydrophilic functional group. As the form of the copolymer, it is possible to use any of a random copolymer, a block copolymer, an alternating copolymer, and a graft copolymer.

The resin dispersant described here has a function of improving the dispersibility of the pigment. The resin dispersant is common to the resin particles described below in terms of being formed of the resin, but differs in terms of the resin particles being an emulsion in the ink and the resin dispersant not being an emulsion in the ink. For example, the resin dispersant has water solubility. In addition, or alternatively, the resin dispersant is present around the pigment by attaching to the pigment or the like.

It is possible to appropriately select the content ratio of the resin dispersant according to the pigment to be dispersed, but the content ratio is preferably 5 parts by mass or more and 200 parts by mass or less with respect to 100 parts by mass of the pigment content in the ink, and more preferably 20 parts by mass or more and 120 parts by mass or less.

The content of the pigment in the ink is preferably 0.3% by mass or more and 20% by mass or less with respect to the total mass of the ink, more preferably 0.5% by mass or more and 15% by mass or less, even more preferably 1% to 10% by mass, and particularly preferably 1.5 to 5% by mass. When the content of the pigment is in the above range, clogging of the nozzles of the ink jet recording apparatus does not easily occur and it is possible to have a sufficiently satisfactory color density. In addition, when the content of the pigment is the above range or more, it is easy to form an image with an excellent coloring property.

Aggregation Property of Pigment

As described above, it is possible to measure the volume average particle diameter after mixing the inks with the test liquid. The above pigments are examples of components included in the ink and having a particle diameter. Therefore, adjusting the volume average particle diameter of the pigment after aggregation makes it possible to adjust the volume average particle diameter after ink mixing.

It is possible to measure the ease of aggregation (aggregation property) of the pigment. The volume average particle diameter of the pigment after aggregation is measured using a pigment dispersion or the like. This is a pigment dispersion used for the preparation of ink, or the like. This measurement is carried out in the same manner as the measurement of the volume average particle diameter after mixing the resin particles. Instead of the solid content of the resin in the resin dispersion, the solid content of the pigment of the pigment dispersion is measured. Similarly to the resin particles, it is also possible to measure the degree of aggregation (%) which is the increase rate of the volume average particle diameter of the pigment before and after mixing. The degree of aggregation (%) of the pigment is preferably 400% or more from the viewpoint of aggregating using the treatment liquid to obtain excellent image quality.

It is possible to adjust the volume average particle diameter of the pigment after mixing by adjusting the amount of the anionic group which the pigment has on the surface thereof, adjusting the volume average particle diameter of the pigment, or adjusting the acid value of the resin in a case of dispersing the pigment using a resin dispersant. Examples of anionic groups include a carboxyl group, a sulfone group, and the like. For example, increasing the amount of the anionic group of the pigment or increasing the acid value of the resin makes it possible to obtain a pigment which is easy to aggregate and to increase the volume average particle diameter after mixing. By doing the reverse, it is possible to obtain a pigment which is difficult to aggregate. Using a pigment having a small volume average particle diameter before mixing makes it possible to increase the volume average particle diameter of the pigment after mixing. It is presumed that the smaller the volume average particle diameter before mixing, the larger the contact area with the aggregating agent and the greater the aggregation property. The volume average particle diameter of the obtained pigment after mixing may be measured in order to select and use a desired coloring material. The acid value of the resin dispersant is preferably 20 mg/g KOH or more in terms of increasing the degree of aggregation of the pigment, more preferably 30 mg/g KOH or more, and even more preferably 50 mg/g KOH or more. Although the upper limit is not limited, the upper limit is preferably 200 mg/g KOH or more, and more preferably 150 mg/g KOH or more.

The pigment to be used for this ink may be selected and used according to the volume average particle diameter of the target ink after mixing and the volume average particle diameter of the resin used in the ink after mixing. Alternatively, the resin particles to be used in this ink may be selected and used according to the volume average particle diameter of the target ink after mixing and the volume average particle diameter of the pigment used in the ink after mixing.

Resin

The ink includes at least the resin fine particles described above as a resin, but may further include other resins than the resin fine particles. Examples of such resins include the resin dispersants described above and other resins. The content of the resin included in the ink is preferably 50 parts by mass or more with respect to 100 parts by mass of the pigment content included in the ink, more preferably 100 parts by mass or more, even more preferably 150 parts by mass or more, and even more preferably 200 parts by mass or more. In such a case, the upper limit of the content ratio of the resin included in the ink is 500 parts by mass or less with respect to 100 parts by mass of the pigment content included the ink, preferably 400 parts by mass or less, more preferably 300 parts by mass or less, and even more preferably 250 parts by mass or less.

For example, the pigment may be dispersed using a resin dispersant, or the like. When the content ratio of the resin combining the resin particles and other resins is in this range, it is possible to sufficiently obtain the fixing property of the ink to the recording medium, and to keep the viscosity of the ink at an appropriate level, for example, to suppress clogging and the like in an ink jet head. Furthermore, the content of the resin in which the resin particles and the resin dispersant are combined may be in the above range of the content of the resin.

1.1.3. Other Components

The ink may include components such as a water-soluble organic solvent, a surfactant, and an additive.

Water-Soluble Organic Solvent

The ink included in the ink set of the present embodiment may contain a water-soluble organic solvent. One of the functions of the water-soluble organic solvent is to improve the wettability of the ink with respect to the recording medium and to increase the moisture retention of the ink. Examples of water-soluble organic solvents include esters, alkylene glycol ethers, cyclic esters, nitrogen-containing solvents, polyhydric alcohols, and the like. Examples of nitrogen-containing solvents include cyclic amides, non-cyclic amides, and the like. Examples of non-cyclic amides include alkoxyalkylamides, and the like.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

The alkylene glycol ethers may be monoethers or diethers of alkylene glycols, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and compounds in which the hydrogen of the methylene group adjacent to the carbonyl group is substituted with an alkyl group having 1 to 4 carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, 1-butyl-2-pyrrolidone, and the like. These are preferable from the viewpoint of promoting film formation with the resin particles, and 2-pyrrolidone is particularly preferable.

In addition, it is also preferable to use a compound represented by General Formula (1) as an alkoxyalkylamide.

$$R^1-O-CH_2CH_2-(C=O)-NR^2R^3 \quad (1)$$

In Formula (1), $R^1$ represents an alkyl group having 1 to 4 carbon atoms, and $R^2$ and $R^3$ each independently represent a methyl group or an ethyl group. It is possible for the "alkyl group having 1 to 4 carbon atoms" to be a linear or branched alkyl group, and examples thereof include a methyl group, an ethyl group, an n-propyl group, an iso-propyl group, an n-butyl group, a sec-butyl group, an iso-butyl group, and a tert-butyl group. The compound represented by Formula (1) may be used alone or in a combination of two or more types thereof.

Examples of the function of the compound represented by Formula (1) include improving the surface drying property and fixing property of the ink attached on the low-absorption recording medium. In particular, the compound represented by Formula (1) is excellent in the effect of moderately softening and dissolving the vinyl chloride-based resin. Therefore, the compound represented by Formula (1) is able to soften and dissolve the recording surface including the vinyl chloride-based resin to allow the ink to permeate into the low-absorption recording medium. As the ink permeates into the low-absorption recording medium in this manner, the ink fixes firmly thereto and the surface of the ink dries easily. Accordingly, the obtained image tends to be excellent in the surface drying property and fixing property.

In Formula (1), $R^1$ is more preferably a methyl group having 1 carbon atom. In Formula (1), the standard boiling point of the compound in which $R^1$ is a methyl group is lower than the standard boiling point of the compound in which $R^1$ is an alkyl group having 2 to 4 carbon atoms. Therefore, when a compound in which $R^1$ is a methyl group in Formula (1) is used, it may be possible to further improve the surface drying property of the attachment region (in particular, the surface drying property of the image in a case of recording in a high temperature and high humidity environment).

In a case of using the compound represented by Formula (1), the content is not particularly limited with respect to the total mass of the ink, but is approximately 5% by mass or more and 50% by mass or less, and preferably 8% by mass or more and 48% by mass or less. When the content of the compound represented by Formula (1) is in the above range, it is possible to further improve the fixing property and the surface drying property of the image.

Examples of polyhydric alcohols include 1,2-alkanediols (for example, alkanediols such as ethylene glycol, propylene glycol (other name: propane-1,2-diol), 1,2-butanediol, 1,2-pentanediol, 1,2-hexanediol, 1,2-heptanediol, and 1,2-octanediol), polyhydric alcohols (polyols) other than 1,2-alkanediol (for example, diethylene glycol, dipropylene glycol, 1,3-propanediol, 1,3-butanediol (other name: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methyl pentane-2,4-diol, trimethylolpropane, glycerine, and the like) and the like.

It is possible to divide polyhydric alcohols into alkanediols and polyols. Alkanediols are diols of alkanes having 5 or more carbon atoms. The number of carbon atoms of the alkane is preferably 5 to 15, more preferably 6 to 10, and even more preferably 6 to 8. 1,2-alkanediol is preferable.

Polyols are polyols of alkanes having 4 or less carbon atoms or intermolecular condensates of hydroxyl groups of polyols of alkanes having 4 or less carbon atoms. The number of carbon atoms of the alkane is preferably 2 to 3. The number of hydroxyl groups in the molecule of the polyols is 2 or more, preferably 5 or less, and more preferably 3 or less. In a case where the polyols are the intermolecular condensate described above, the intermolecular condensation number is 2 or more, preferably 4 or less, and more preferably 3 or less. It is possible to use the polyhydric alcohols alone or in a combination of two or more types.

It is possible for alkanediols and polyols to mainly function as penetrating solvents and/or moisturizing solvents. However, alkanediols tend to have strong properties as a penetrating solvent, and polyols tend to have strong properties as a moisturizing solvent.

For the ink, one type of water-soluble organic solvent may be used alone or a combination of two or more types may be used. In addition, the total content of the water-soluble organic solvent with respect to the total mass of the ink is, for example, 5% by mass or more and 50% by mass or less, preferably 10% by mass or more and 45% by mass or less, more preferably 15% by mass or more and 40% by mass or less, and even more preferably 20% by mass or more and 40% by mass or less. When the content of the water-soluble organic solvent is in the above range, the balance between the wettability and the drying property is further improved and an image with high image quality is easily formed.

In the ink, the content of the polyol organic solvent which is a liquid in an environment of 25° C. and which has a standard boiling point exceeding 280° C. is preferably 5% by mass or less with respect to the total mass of the treatment liquid. The content is more preferably 3% by mass or less, even more preferably 1% by mass or less, and particularly preferably 0.5% by mass or less. The lower limit of the content is 0% by mass or more and the organic solvent may not be included. This makes it possible to improve the drying property of the treatment liquid attached to the recording medium and improve the adhesion of the treatment liquid to the recording medium. Furthermore, in the treatment liquid, the content of an organic solvent (not limited to polyols) which is a liquid in an environment of 25° C. and which has a standard boiling point exceeding 280° C. is more preferably in the above range with respect to the total mass of the treatment liquid in view of the above points. Examples of the organic solvent having a standard boiling point exceeding 280° C. include glycerin, polyethylene glycol monomethyl ether, and the like.

The content of the nitrogen-containing solvent in the ink is preferably 1% by mass or more and 25% by mass or less from the viewpoint of superior abrasion resistance and the like, more preferably 5% by mass or more and 23% by mass or less, even more preferably 7% by mass or more and 20% by mass or less, and particularly preferably 11% by mass or more and 17% by mass or less.

The content of the polyhydric alcohols in the ink is preferably 1% by mass or more and 27% by mass or less from the viewpoint of superior abrasion resistance and the like, more preferably 5% by mass or more and 15% by mass or less, and even more preferably 7% by mass or more and 13% by mass or less.

Surfactant

The ink may contain a surfactant. The surfactant has a function of lowering the surface tension of the ink and improving the wettability with the recording medium. Among surfactants, for example, it is possible to preferably use acetylene glycol-based surfactants, silicone-based surfactants, and fluorine-based surfactants.

The acetylene glycol-based surfactant is not particularly limited, but examples thereof include Surfynol 104, 104E, 104H, 104A, 104BC, 104DPM, 104PA, 104PG-50, 104S, 420, 440, 465, 485, SE, SE-F, 504, 61, DF 37, CT 111, CT 121, CT 131, CT 136, TG, GA, and DF 110 D (the above are all product names, manufactured by Air Products & Chemicals, Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (the above are all product names, manufactured by Nissin Chemical Co., Ltd.), Acetylenol E00, E00P, E40, and E100 (the above are all product names, manufactured by Kawaken Fine Chemicals Co., Ltd.).

The silicone-based surfactant is not particularly limited, but preferable examples thereof include polysiloxane-based compounds. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (product names, manufactured by BYK Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are all product names, manufactured by Shin-Etsu Chemical Co., Ltd.).

As the fluorine-based surfactant, it is preferable to use fluorine-modified polymers, and specific examples thereof include BYK-3440 (manufactured by BYK Japan), Surflon S-241, S-242, and S-243 (product names, manufactured by AGC Seimi Chemical Co., Ltd.), Futagent 215 M (manufactured by Neos Corp.), and the like.

In a case where a surfactant is contained in the ink, a plurality of kinds may be contained. In a case where the surfactant is contained in the ink, the content is 0.1% by mass or more and 1.5% by mass or less with respect to the total mass of the ink, preferably 0.2% by mass or more and 1.0% by mass or less, and more preferably 0.3% by mass or more and 0.8% by mass or less.

Additives

As additives, the ink may include ureas, amines, saccharides, and the like. Examples of ureas include urea, ethyleneurea, tetramethylurea, thiourea, 1,3-dimethyl-2-imidazolidinone, and the like, and betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like), and the like.

Examples of the amines include diethanolamine, triethanolamine, triisopropanolamine, and the like. Ureas and amines may function as pH adjusting agents.

Examples of saccharides include glucose, mannose, fructose, ribose, xylose, arabinose, galactose, aldonic acid, glucitol (sorbit), maltose, cellobiose, lactose, sucrose, trehalose, maltotriose, and the like.

Others

As necessary, the ink according to the present embodiment may further include components such as an anti-septic/mildewproofing agent, a rust preventive agent, a chelating agent, a wax, a viscosity modifier, an anti-oxidant, and a preservative.

1.1.4. Physical Properties of Ink

From the viewpoint of making the wettability to the recording medium appropriate, the ink included in the ink set of the present embodiment has a surface tension at 25° C. of 40 mN/m or less, preferably 38 mN/m or less, more preferably 35 mN/m or less, and even more preferably 30 mN/m or less. It is possible to measure the surface tension by confirming the surface tension when a platinum plate is wetted with the composition in an environment of 25° C. using an automatic surface tensiometer CBVP-Z (manufactured by Kyowa Interface Science, Inc.).

Examples of methods for attaching the ink to the recording medium include non-contact type and contact type methods or combinations thereof, such as a method of ejecting/coating fine liquid droplets by an ink jet method, a method of coating a white ink composition on a recording medium using various kinds of spray, a method of coating by immersing a recording medium in ink, a method of coating ink on a recording medium with a brush or the like.

However, the ink is more preferably attached to the recording medium by an ink jet method. In such a case, the viscosity at 20° C. is preferably 1.5 mPa·s or more and 15 mPa·s or less, more preferably 1.5 mPa·s or more and 5 mPa·s or less, and even more preferably 1.5 mPa·s or more and 3.6 mPa·s or less. In a case where ink is attached to a recording medium by an ink jet method, it is easy to efficiently form a predetermined image on a recording medium.

Ink is obtained by mixing the components described above in an arbitrary order and, as necessary, carrying out filtration or the like to remove impurities. As a method of mixing the respective components, a method in which materials are sequentially added to a container provided with a stirring apparatus such as a mechanical stirrer and a magnetic stirrer, and stirring and mixing is carried out is suitably used. As a filtration method, it is possible to carry out centrifugal filtration, filter filtration, and the like as necessary.

1.2. Ink in Ink Set

First Ink and Second Ink

The ink set of the present embodiment is provided with two or more of the inks described above. Therefore, one of the inks included in the ink set is referred to as the first ink, and one of the other inks is referred to as the second ink. The two or more inks differ at least in that the included pigments are different from each other. Accordingly, each of the first ink and the second ink contains a pigment and a resin including resin particles, but the pigment contained in the first ink is referred to as a first pigment, and the pigment contained in the second ink is referred to as a second pigment different from the first pigment.

It is possible to freely select the first pigment and the second pigment as long as these are not the same pigment. In addition, the first pigment and the second pigment may be the same color or different colors.

Third Ink

In the ink set of the present embodiment, in a case where three or more of the inks described above are provided, an ink other than the first ink and the second ink among the inks included in the ink set may be referred to as a third ink. The third ink differs at least in the point that the pigments included therein include a third pigment different from the first pigment and the second pigment included in the first ink and the second ink. That is, the third ink is a water-based ink composition containing a third pigment, which is a pigment different from the first pigment and the second pigment, and a resin including resin particles.

In a case where the ink set of the present embodiment is provided with three inks and where the first ink, the second ink, and the third ink are each mixed with the test liquid, the difference between each of the D50 average particle diameters may be a maximum of 40% or less. Furthermore, in the case where the ink set of the present embodiment is provided with four or more inks, when four or more inks are each mixed with the test liquid, the difference between the D50 average particle diameters of each may be set to be 40% or less as a maximum. In addition, from the viewpoint that it is possible to further reduce the difference in gloss (uneven gloss) in the image to be formed, these differences are preferably set to be similar to the range of the difference in average particle diameter of the first ink and the second ink after aggregation, more preferably 30% or less, and even more preferably 20% or less. In a case where 3 or more or 4 or more inks are provided, the difference in the average particle diameters thereof after aggregation is also preferably in the above range. In addition, in a case of using the treatment liquid in a case where three or three or more (or four, four or more, or the like) inks are provided, it is also preferable to set the difference in the average particle diameter after aggregation during mixing of the treatment liquid in the range described above.

2. Treatment Liquid

The ink set of the present embodiment is used for recording together with a treatment liquid including an aggregating agent for aggregating the components of the water-based ink compositions (the inks described above).

2.1. Aggregating Agent

The treatment liquid includes an aggregating agent for aggregating the components of the ink. The aggregating agent has an effect of aggregating pigment and resin particles by reacting components such as the pigment included in the ink and the resin particles included in the ink. However, the degree of aggregation of the pigment or resin particles due to the aggregating agent varies depending on the kind of each of the aggregating agent, the pigment, and the resin particles, the method of dispersing the pigment, and the like, and it is possible to carry out adjustments by selecting the blends thereof. For example, this aggregation makes it possible to increase the coloring of the pigment, to improve the fixing property of the resin particles, and/or to increase the viscosity of the ink.

The aggregating agent is not particularly limited, but examples thereof include a metal salt, an inorganic acid, an organic acid, a cationic compound, and the like, and as the cationic compound, it is possible to use a cationic resin (cationic polymer), a cationic surfactant, and the like. Among these, a polyvalent metal salt is preferable as the metal salt, and a cationic resin is preferable as the cationic compound. Therefore, as the aggregating agent, it is preferable to use any one type of a cationic resin, an organic acid, and a polyvalent metal salt from the viewpoint of obtaining particularly excellent image quality, abrasion resistance, gloss, and the like.

The metal salt is preferably a polyvalent metal salt, but it is also possible to use metal salts other than polyvalent metal salts. Among these aggregating agents, it is preferable to use at least one type selected from a metal salt and an organic acid from the viewpoint of excellent reactivity with components included in the ink. In addition, among the cationic compounds, cationic resins are preferably used from the viewpoint of easy dissolution in the treatment liquid. In addition, it is also possible to use a plurality of aggregating agents in combination.

The polyvalent metal salt is a compound formed of divalent or higher valent metal ions and anions. Examples of the divalent or higher valent metal ion include ions such as calcium, magnesium, copper, nickel, zinc, barium, aluminum, titanium, strontium, chromium, cobalt, and iron. Among these metal ions forming the polyvalent metal salt, the metal ions are preferably at least one of calcium ions and magnesium ions from the viewpoint of an excellent aggregation property of components of the ink composition.

The anions forming the polyvalent metal salt are inorganic ions or organic ions. That is, the polyvalent metal salt in the invention is formed of inorganic ions or organic ions and polyvalent metals. Examples of such inorganic ions include chloride ions, bromide ions, iodide ions, nitrate ions, sulfate ions, hydroxide ions, and the like. Examples of organic ions include organic acid ions, for example, carboxylate ions.

The polyvalent metal compound is preferably an ionic polyvalent metal salt, and in particular, in a case where the polyvalent metal salt is a magnesium salt or a calcium salt, the stability of the treatment liquid is improved. In addition, the counter ions of the polyvalent metal may be either inorganic acid ions or organic acid ions.

Specific examples of the polyvalent metal salt include calcium carbonates such as heavy calcium carbonate and light calcium carbonate, calcium nitrate, calcium chloride, calcium sulfate, magnesium sulfate, calcium hydroxide, magnesium chloride, magnesium carbonate, barium sulfate, chloride barium, zinc carbonate, zinc sulfide, aluminum silicate, calcium silicate, magnesium silicate, copper nitrate, calcium acetate, magnesium acetate, aluminum acetate, and the like. These polyvalent metal salts may be used alone or in a combination of two or more types. Among these, since it is possible to preserve sufficient solubility in water and reduce marks due to the treatment liquid (the traces are not noticeable), at least one of magnesium sulfate, calcium nitrate, and calcium chloride is preferable, and calcium nitrate is more preferable. These metal salts may have hydration water in the form of a raw material.

Examples of metal salts other than polyvalent metal salts include monovalent metal salts such as sodium salt and potassium salt. Other examples include sodium sulfate, potassium sulfate, and the like.

Preferable examples of organic acids include poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, salts thereof, and the like. One type of organic acid may be used alone or a combination of two or more types may be used. Metal salts which are salts of organic acids are included in the metal salts described above.

Preferable examples of inorganic acids include sulfuric acid, hydrochloric acid, nitric acid, phosphoric acid, salts thereof, and the like. One type of inorganic acid may be used alone or a combination of two or more types may be used.

Examples of cationic resins (cationic polymers) include cationic urethane-based resin, cationic olefin-based resin, cationic amine-based resin, and the like.

As the cationic urethane-based resin, it is possible to appropriately select and use known resins. As the cationic urethane-based resin, it is possible to use commercially available products, and, for example, it is possible to use Hydran CP-7010, CP-7020, CP-7030, CP-7040, CP-7050, CP-7060, and CP-7610, (product names, manufactured by DIC Corp.), Superflex 600, 610, 620, 630, 640, and 650 (product names, manufactured by DKS Co., Ltd.), urethane emulsions WBR-2120C and WBR-2122C (product names, manufactured by Taisei Fine Chemical Co., Ltd.) and the like.

The cationic olefin resin has an olefin such as ethylene, propylene or the like in the structural skeleton thereof, and it is possible to appropriately select and use known resins. In addition, the cationic olefin resin may be in an emulsion state in which the cationic olefin resin is dispersed in a solvent including water, an organic solvent, or the like. As the cationic olefin resin, it is possible to use commercially available products and examples thereof include Arrowbase CB-1200 and CD-1200 (product names, manufactured by Unitika Ltd.), and the like.

As the cationic amine-based resin (cationic polymer), any cationic amine-based resin having an amino group in the structure may be used and it is possible to appropriately select and use known resins. Examples thereof include polyamine resin, polyamide resin, polyallylamine resin, and the like. The polyamine resin is a resin having an amino group in the main skeleton of the resin. The polyamide resin is a resin having an amide group in the main skeleton of the resin. The polyallylamine resin is a resin having a structure derived from an allyl group in the main skeleton of the resin.

The polyallylamine resin is, for example, polyallylamine hydrochloride, polyallylamine amide sulfate, allylamine hydrochloride diallylamine hydrochloride copolymer, allylamine acetate diallylamine acetate copolymer, allylamine hydrochloride dimethyl allylamine hydrochloride copolymer, allylamine dimethylallylamine copolymer, polydiallylamine hydrochloride, polymethyldiallylamine hydrochloride, polymethyldiallylamine amide sulfate, polymethyldiallylamine acetate, polydiallyldimethylammonium chloride, diallylamine acetate sulfur dioxide copolymer, diallyl methyl ethyl ammonium ethyl sulfate sulfur dioxide copolymer, methyl diallylamine hydrochloride sulfur dioxide copolymer, diallyldimethylammonium chloridesulfur dioxide copolymer, diallyldimethylammonium chloride-acrylamide copolymer, and the like. As such a cationic allylamine-based resin, it is possible to use commercially available products and it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D 11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (product names, manufactured by Nittobo Medical Co., Ltd.), Hymo Neo-600, Hymoloc Q-101, Q-311, Q-501, Himax SC-505, and SC-505 (product names, manufactured by Hymo Co., Ltd.), and the like.

Examples of cationic polyamine-based resins include Unisense KHE 103L manufactured by Senka Corp. (hexamethylene diamine/epichlorohydrin resin, 1% water-based solution with a pH of approximately 5.0, viscosity of 20 to 50 (mPa·s), and a water-based solution with a solid content concentration of 50% by mass), Unisense KHE104L (dimethylamine/epichlorohydrin resin, 1% water-based solution with a pH of approximately 7.0, a viscosity of 1 to 10 (mPa·s), and a water-based solution with a solid content concentration of 20% by mass), Catiomaster PD series manufactured by Yokkaichi Chemical Company, Limited. (amine.epichlorohydrin condensation type polymer water-based solution), and the like.

Examples of the cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salt, imidazolinium salts, and the like. Specific examples thereof include hydrochlorides and acetates such as laurylamine, Palm amine, and rosinamine, and the like, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxyethyl laurylamine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

A plurality of types of these aggregating agents may be used. In addition, if at least one type of the polyvalent metal salt, organic acid, and cationic resin is selected from among these aggregating agents, the aggregating action is better, such that it is possible to form an image of higher image quality (in particular, a good coloring property).

The total content of the aggregating agent in the treatment liquid is, for example, 0.1% by mass or more and 20% by mass or less with respect to the total mass of the treatment liquid, preferably 0.5% by mass or more and 15% by mass or less, and more preferably 2% by mass or more and 10% by mass or less. Even in a case where the aggregating agent is common to both the solution and the dispersion, the solid content is preferably in the above range. When the content of the aggregating agent is 0.1% by mass or more, it is possible to obtain a sufficient performance in terms of the aggregating agent aggregating the components included in the ink. In addition, setting the content of the aggregating agent is 30% by mass or less makes the solubility and dispersibility of the aggregating agent in the treatment liquid better, and makes it possible to improve storage stability and the like of the treatment liquid.

Even in a case where the organic solvent included in the treatment liquid has high hydrophobicity, from the point of view of satisfactory solubility of the aggregating agent in the treatment liquid, it is preferable to use an aggregating agent in which the solubility in 100 g of water at 25° C. is 1 g or more, and more preferable to use an aggregating agent in which the solubility is 3 g or more and 80 g or less.

2.2. Other Components

The treatment liquid is preferably a water-based composition. In addition to the aggregating agent, components may be included as described in the section "1.1. Ink" such as water, a water-soluble organic solvent, a surfactant, an additive, an anti-septic/mildewproofing agent, a rust preventive agent, a chelating agent, a viscosity modifier, an anti-oxidant, a preservative, and resins. The content of the coloring material in the treatment liquid is preferably 0.1% by mass or less in the treatment liquid, more preferably 0.05% by mass or less, and even more preferably 0.01% by mass or less, and the lower limit is 0% by mass or more.

2.3. Physical Properties of Treatment Liquid

From the viewpoint of making the wettability to the recording medium appropriate, the surface tension of the treatment liquid according to the present embodiment at 25° C. is 40 mN/m or less, preferably 38 mN/m or less, more preferably 35 mN/m or less, and even more preferably 30 mN/m or less. It is possible to measure the surface tension by confirming the surface tension when a platinum plate is wetted with the composition in an environment of 25° C. using an automatic surface tensiometer CBVP-Z (manufactured by Kyowa Interface Science, Inc.).

The treatment liquid is obtained by mixing the components described above in an arbitrary order and, as necessary, carrying out filtration or the like to remove impurities. As a method of mixing the respective components, a method in which materials are sequentially added to a container provided with a stirring apparatus such as a mechanical stirrer and a magnetic stirrer, and stirring and mixing is carried out is suitably used. As a filtration method, it is possible to carry out centrifugal filtration, filter filtration, and the like as necessary.

3. Recording Method

The recording method according to the present embodiment is provided with a step of attaching the treatment liquid to a recording medium using the ink set described above, a step of attaching the first ink to the recording medium, and a step of attaching the second ink to the recording medium.

3.1. Recording Medium

The recording medium on which an image is formed by the recording method according to the present embodiment may have a recording surface which absorbs liquids such as ink and a treatment liquid or may not have a recording surface which absorbs liquid. Therefore, the recording medium is not particularly limited, and examples thereof include liquid absorbing recording media such as paper, film, and cloth, liquid low-absorption recording media such as printed paper, liquid non-absorption recording media such as metal, glass, and polymers, and the like. However, the excellent effect of the recording method of the present embodiment is more remarkable in the case of recording an image on a liquid low-absorption or liquid non-absorption recording medium.

The liquid low-absorption or liquid non-absorption recording medium refers to a recording medium having a property of not absorbing or absorbing almost none of the ink composition or the treatment liquid. Quantitatively, a liquid non-absorption or liquid low-absorption recording medium refers to a "recording medium having a water absorption amount of 10 mL/m$^2$ or less in 30 msec$^{1/2}$ from the start of contact in the Bristow method". This Bristow method is the most widely used method as a method for measuring the amount of liquid absorption in a short time and is also adopted by Japan Technical Association of the Pulp and Paper Industry (Japan TAPPI). The details of the test method are described in standard no. 51 "Paper and paperboard—Liquid absorbency test method—Bristow method" of "Japan TAPPI Paper Pulp Test Method 2000 Edition". On the other hand, the liquid absorbing recording medium refers to a recording medium which does not correspond to liquid non-absorption or liquid low-absorption. In this specification, liquid low-absorption or liquid non-absorption may be simply referred to as low absorption and non-absorption.

Examples of liquid non-absorption recording media include a recording medium in which a plastic is coated on a base material such as paper, a recording medium in which a plastic film is attached to a base material such as paper, a plastic film which does not have an absorbing layer (receiving layer), and the like. Examples of plastics here include polyvinyl chloride, polyethylene terephthalate, polycarbonate, polystyrene, polyurethane, polyethylene, polypropylene, and the like.

In addition, examples of a liquid low-absorption recording medium include a recording medium provided with a coating layer (receiving layer) for receiving a liquid such as ink or treatment liquid on the surface thereof, and examples of a recording medium in which the base material was paper include printed paper such as art paper, coated paper, and mat paper, and in a case where the base material is a plastic film, examples thereof include a recording medium in which a hydrophilic polymer or the like is coated on the surface of polyvinyl chloride, polyethylene terephthalate, polycarbonate, polystyrene, polyurethane, polyethylene, polypropylene, or the like, and a recording medium in which particles such as silica and titanium are coated with a binder.

It is possible to suitably use the recording method according to the present embodiment for a soft packaging film. The soft packaging film is one form of the liquid non-absorption recording medium described above. More specifically, soft packaging films are highly flexible film materials used for food packaging, toiletry, cosmetic packaging, and the like, materials having anti-fogging properties and anti-static properties, and film materials in which anti-oxidants and the like are present on the film surface and which have a thickness in the range of 5 to 70 μm (preferably 10 to 50 μm). In a case where a treatment liquid is attached to this film or an ink composition is attached, it is harder to fix the ink composition, compared to a plastic film having a normal thickness, and even when fixed, the treatment liquid and ink composition do not easily correspond to (follow) the flexibility of the film and peeling is likely to occur. However, the recording method according to the present embodiment is more suitable for a soft packaging film.

In the materials forming the recording surface of the soft packaging film, it is possible to use materials including at least one type of resin selected from olefin-based resins (polyethylene, polypropylene, and the like), ester-based resins (polyester and the like), vinyl chloride-based resins (polyvinyl chloride and the like), amide-based resins (polyamide and the like). As the film base material including the recording surface of the soft packaging film, it is possible to use these resins processed into films or sheets. In the case of a film or sheet using a resin, it is possible to use any of an unstretched film, a stretched film stretched in a uniaxial direction or a biaxial direction, or the like, and a film stretched in a biaxial direction is preferable. In addition, it is also possible to use films or sheets made of these various resins in a laminated state of being bonded to each other, as necessary.

In addition, it is also possible to suitably use the recording method according to the present embodiment for a recording medium for sign graphics. Recording media for sign graphics cover various media in which the base material is a banner, coated paper, matte paper, wallpaper, cloth, plastic films such as PET or PVC, or the like, as described above, but it is possible to particularly suitably use the recording method according to the present embodiment with respect to a transparent or semi-transparent plastic film used for a window display, car wrapping, or the like. These films are often used in a form in which the base material is formed of flexible polyolefin, PET, PVC, or the like and which has an adhesive layer on the opposite side to the printed surface, and, after printing, the films are used after being pasted on window glass, a car body, and the like using the adhesive surface. In a case where a treatment liquid is attached or ink is attached to the film, the ink is not easily fixed, and even when fixed, the treatment liquid and the ink do not easily correspond to (follow) the flexibility of the film and peeling is likely to occur. However, the recording method according to the present embodiment is also more suitable for films for sign graphics.

Regarding the materials forming the recording surface of a film for sign graphics, it is possible to use materials including at least one type of resin selected from olefin-based resins (polyethylene, polypropylene, and the like), ester-based resins (polyester and the like), vinyl chloride-based resins (polyvinyl chloride and the like), and amide-based resins (polyamide and the like).

The recording medium may be colorless transparent, semi-transparent, colored transparent, colored opaque, colorless opaque, and the like. In addition, the recording medium itself may be colored, translucent, or transparent. In such a case, using an ink including a white pigment as a background image ink makes it possible to have a function as a concealing layer for concealing the color of the recording medium itself. In addition, for example, when a color image is recorded, if a background image is previously recorded in the region for recording the color image using ink for a background image, it may be possible to improve the coloring property of the color image.

3.2. Step of Attaching Treatment Liquid to Recording Medium

Examples of methods for attaching the treatment liquid to the recording medium include non-contact type and contact type methods or combinations thereof, such as a method of ejecting and coating fine liquid droplets by an ink jet method, a method of coating a treatment liquid by a roller, a method of coating a treatment liquid to a recording medium using various kinds of spray, a method of coating by immersing a recording medium in a treatment liquid, a method of coating a treatment liquid on a recording medium with a brush or the like, and the like.

In a case where the treatment liquid is attached to the recording medium by a method other than the ink jet method, the viscosity at 20° C. may be higher than that in the case of the ink jet method, for example, 1.5 mPa·s or more and 100 mPa·s or less, preferably 1.5 mPa·s or more and 50 mPa·s or less, and more preferably 1.5 mPa·s or more and 20 mPa·s or less. It is possible to measure the viscosity by raising the Shear Rate from 10 to 1000 in an environment of 20° C. using a viscoelasticity tester MCR-300 (manufactured by Pysica) and reading the viscosity at Shear Rate 200.

In addition, the treatment liquid may be attached to a recording medium by an ink jet method, and in such a case, the viscosity at 20° C. is preferably 1.5 mPa·s or more and 15 mPa·s or less, more preferably 1.5 mPa·s or more and 5 mPa·s or less, and even more preferably 1.5 mPa·s or more and 3.6 mPa·s or less.

3.3. Step of Attaching Ink to Recording Medium

The recording method of the present embodiment includes a step of attaching ink to a recording medium. The ink to be attached to the recording medium by the recording method of the present embodiment may be a plurality of types (for example, the first ink, the second ink, and the third ink), and it is possible to perform this step a plurality of times according to the number of inks. The recording method of the present embodiment includes a step of attaching at least the first ink and the second ink to the recording medium.

In the step of attaching the ink of the recording method according to the present embodiment to the recording medium, it is possible to use gravure printing, screen printing, flexographic printing, offset printing, an ink jet method, or the like. Preferably, the method is an ink jet method, which is able to be performed using an ink jet recording apparatus having a recording head. That is, as necessary, the step of attaching the treatment liquid to the recording medium and/or the step of attaching the ink to the recording medium may be performed by the ink jet method. A description will be given of an ink jet recording apparatus which is able to be used for the recording method according to the present embodiment.

3.4. Ink Jet Recording Apparatus

It is possible to use either a serial type or line type ink jet recording apparatus. In these types of ink jet recording apparatuses, a recording head is mounted, and droplets of the ink composition are ejected from the nozzle holes of the recording head at a predetermined timing and at a predetermined volume (mass) while changing the relative positional relationship between the recording medium and the recording head, and it is possible to form a predetermined image by attaching a treatment liquid or an ink composition to the recording medium.

For the ink jet recording apparatus used in the present embodiment, for example, it is possible to arbitrarily adopt a known configuration such as a drying unit, a roll unit, or a winding apparatus. In addition, it is possible for the ink jet recording apparatus to have a transport means for transporting a recording medium, an image layer forming means for recording an image using a treatment liquid or an ink composition, a drying means, a whole apparatus drying means for heating and blowing the recording surface, and the like.

It is possible to form the transport means by, for example, a roller. The transport means may have a plurality of rollers. As long as it is possible to transport the recording medium, the position and the number of the transport means to be provided are arbitrary. The transport means may be provided with a paper feed roll, a paper feed tray, a paper ejecting roll, a paper ejecting tray, various platens, and the like.

The image layer forming means records the image layer by ejecting the treatment liquid or the ink composition of the present embodiment onto the recording surface of the recording medium. The image layer forming means is provided with a recording head provided with nozzles, and the recording heads may be different for each composition, or a nozzle row may be assigned for each composition.

It is possible to use the drying means for drying the image layer formed on the recording surface or for removing volatile components on the recording medium. The drying means may be provided at any position and in any number in consideration of the timing of the attachment step, the transport path of the recording medium and the like. Examples of the image layer drying means include a method of applying heat to the recording medium by heating the platen or the like, a method of blowing air onto the image on the recording medium, a method combining the above, and the like. Specifically, the means used in these methods may be forced air heating, radiation heating, conductive heating, high frequency drying, microwave drying, or the like.

3.5. Attachment Step, Other Steps, and Step Modifications

As described above, the recording method of the present embodiment has a step of attaching the treatment liquid to the recording medium and a step of attaching the ink to the recording medium. The order and number of these steps are not limited and the steps are able to be appropriately performed as necessary. In addition, it is possible to attach the treatment liquid and the ink to the same region on the recording medium.

For example, in a case where a step of attaching ink is performed after the step of attaching the treatment liquid, if ink is attached to the region of the recording medium to which the treatment liquid is attached, it is possible for the aggregating agent in the treatment liquid to reliably function with respect to the ink. Therefore, it is possible to effectively aggregate the pigments included in the ink, and it is possible to improve the coloring property of the image by the ink.

In this case, when the ink is attached, the treatment liquid may be in a dry state (a state in which the liquid medium of the treatment liquid is entirely evaporated), or may be in a semi-dry state (a state in which the liquid medium of the treatment liquid remains). In either case, it is possible for the aggregating agent to act on the ink, but from the viewpoint of mixing efficiency, it is more preferable to attach the ink in a semi-dry state. In addition, if the amount of the liquid medium of the treatment liquid remaining in the semi-dry state is excessively large, bleeding of the image of the ink may occur, thus, after the treatment liquid is attached, the amount of liquid medium remaining may be adjusted by the appropriate drying means.

For example, in the recording method of the present embodiment, the treatment liquid and the ink may be attached to the heated recording medium. In other words, the treatment liquid, the first ink, and the second ink may be attached to the heated recording medium. The recording medium may be heated when performing the step of attaching the treatment liquid and ink to the recording medium. For example, in a case of recording the treatment liquid and ink using the ink jet recording apparatus described above, the treatment liquid and ink may be ejected from the recording head and attached to the recording medium with the recording medium in a state of being heated by a platen or the like. Although the temperature of the recording medium in this case is not particularly limited, it is possible to set the temperature in consideration of the degree of drying of the treatment liquid, the Tg (glass transition temperature) of the resin component forming the resin particles of the ink, and the like. In a case of considering the Tg of the resin component forming the resin particles, the temperature is set to at least 5° C. higher than the Tg of the resin component forming the resin particles, and preferably at least 10° C. higher.

More specifically, the temperature of the recording medium reached by heating during attachment of the treatment liquid and/or ink is preferably 25° C. or higher and 50° C. or lower, more preferably 30° C. or higher and 40° C. or lower, and even more preferably 32° C. or higher and 38° C. or lower. When the temperature of the recording medium is in this range, it is possible to make the degree of drying of the treatment liquid appropriate and to appropriately perform the film formation of the resin particles in the ink. Due to this, it may be possible to improve at least one of the fixing property and abrasion resistance of the ink.

In the recording region of the recording medium in which the treatment liquid and the ink composition are attached, it is preferable to have a region in which the attachment amount of the ink composition is 5 mg/inch$^2$ or more and 30 mg/inch$^2$ or less, it is more preferable to have a region in which the attachment amount is 10 mg/inch$^2$ or more and 25 mg/inch$^2$ or less, and it is even more preferable to have a region in which the attachment amount is 15 mg/inch$^2$ or more and 22 mg/inch$^2$ or less. In this case, a useful white image is obtained, which is preferable in that the filling property, bleeding resistance, abrasion resistance, and the like are superior. "Having a region having an attachment amount in the above range" means having at least a region having an attachment amount in the above range. Furthermore, in a recording region of the recording medium in which the treatment liquid and the white ink composition are attached, the attachment amount of the white ink composition in the region where the attachment amount of the white ink composition is the maximum is in the range described above, which is preferable in terms of the above points. The first ink and the second ink may be attached to the same region or may be attached to different regions. In the former case, the ink attachment amount is the total attachment amount. In addition, it is also preferable to set the maximum attachment amount of the ink in the recording region in the above range.

It is more preferable to form a recording region in which the attachment amount of treatment liquid is 5% by mass or more and 20% by mass or less with respect to the attachment amount of the ink. In this manner, it is possible to reliably aggregate the components of the ink and it is possible to bring the gloss difference with other regions closer to the designed gloss. From this viewpoint, the attachment amount of the treatment liquid is preferably 7% by mass or more and 15% by mass or less with respect to the attachment amount of the ink, and more preferably 10% by mass or more and 15% by mass or less.

In the recording region of the recording medium in which the treatment liquid and the ink composition are attached, it is preferable to have a region in which the attachment amount of treatment liquid is 5% by mass or more and 30% by mass or less with respect to the attachment amount of the ink composition, it is more preferable to have a region in which the attachment amount is 7 mg/inch$^2$ or more and 20 mg/inch$^2$ or less, and it is even more preferable to have a region in which the attachment amount is 8 mg/inch$^2$ or more and 15 mg/inch$^2$ or less. Such a case is preferable from the viewpoint of superior bleeding resistance and abrasion resistance. Furthermore, in a recording region of the recording medium in which the treatment liquid and the white ink composition are attached, the attachment amount of the treatment liquid in the region where the attachment amount of the treatment liquid is the maximum with respect to the attachment amount of the ink composition being in the range described above is preferable in terms of the above. In addition, it is also preferable to set the maximum attachment amount of the treatment liquid in the recording region in the above range.

Post-Heating Step

A step of heating the recording medium to which the treatment liquid, the first ink, and the second ink are attached may be provided.

The recording method of the present embodiment may be provided with a step (post-heating step) of heating the recording medium after the step of attaching the treatment liquid to the recording medium and the step of attaching the ink composition to the recording medium. In a case of using an ink jet recording apparatus, for example, it is possible to perform the step of heating the recording medium by using the drying means described above. In addition, the step is not limited to the ink jet recording apparatus and is able to be performed by an appropriate drying means. Since it is possible to dry and more sufficiently fix the obtained image due to this, for example, it is possible to set the recorded matter to an immediately usable state. The temperature of the recording medium in this case is not particularly limited, but is able to be set in consideration of the Tg and the like of the resin component forming the resin particles included in the recorded matter. In a case of considering the Tg of the resin component forming the resin particles, the temperature is set to at least 5° C. higher than the Tg of the resin component forming the resin particles, and preferably at least 10° C. higher.

More specifically, the temperature of the recording medium reached by the heating in the post-heating step is 50° C. or higher and 120° C. or lower, preferably 60° C. or higher and 100° C. or lower, and even more preferably 70° C. or higher and 80° C. or lower. When the temperature of the recording medium is in this range, it is possible to perform film formation and flattening with the resin particles included in the recorded matter, and it is possible to dry and more sufficiently fix the obtained image. In addition, it is possible to improve the gloss of an image by melting the components of the ink such as resin particles.

It is possible to appropriately further add other steps to the recording method of the present embodiment, for example, a step of attaching clear ink to a recording medium, or the like.

4. Examples and Comparative Examples

A more detailed description will be given of embodiments of the invention with reference to Examples, but the present embodiment is not limited to these Examples.

4.1. Preparation of Treatment Liquid and Ink

Each component was placed in a container so as to have the compositions shown in Tables 1 to 3, mixed and stirred with a magnetic stirrer for 2 hours, and then filtered with a membrane filter having a pore size of 5 to obtain treatment liquids (R1 to R4), cyan inks (C1 to C12), magenta inks (M1 to M8), yellow inks (Y1 to Y2), and black inks (Bk1 to Bk4). The numerical values in Tables 1 to 3 indicate % by mass. The pigment and resin are the solid contents of the pigment and resin, respectively. The pigment was used as a pigment dispersion and the resin particles were used as a resin dispersion in the preparation of ink.

TABLE 1

| | | Treatment Liquid | | | |
|---|---|---|---|---|---|
| Component | | R1 | R2 | R3 | R4 |
| Aggregating agent | Magnesium sulfate (heptahydrate) | 5 | — | — | — |
| | Calcium chloride (dihydrate) | — | 5 | — | — |
| | Catiomaster PDT-2 | — | — | 5 | — |
| | Catiomaster PD-7 | — | — | — | 5 |
| Organic solvent | 2-pyrrolidone | 15 | 15 | 15 | 15 |
| | 1,3-butanediol | 6 | 6 | 6 | 6 |
| | 1,2-hexanediol | 3 | 3 | 3 | 3 |
| Surfactant | BYK-348 | 2 | 2 | 2 | 2 |
| | Water | Remainder | Remainder | Remainder | Remainder |
| | Total | 100 | 100 | 100 | 100 |

TABLE 2

| | | Ink | | | | | | |
|---|---|---|---|---|---|---|---|---|
| Component | | C1 | C2 | C3 | C4 | C5 | C6 | C7 |
| Pigment | Cyan pigment 1 | 2 | — | — | — | — | — | — |
| | Cyan pigment 2 | — | 2 | 2 | 2 | 2 | 1 | 2 |
| | Magenta pigment | — | — | — | — | — | — | — |
| | Yellow pigment | — | — | — | — | — | — | — |
| | Black pigment | — | — | — | — | — | — | — |
| Resin dispersant | Water-soluble resin 1 | 0.5 | 0.5 | 0.4 | 0.6 | — | 0.25 | 4.5 |
| | Water-soluble resin 2 | — | — | — | — | 0.5 | — | — |
| Resin particles | Resin particles 1 | 4 | 4 | 4 | 4 | 4 | 4 | — |
| | Resin particles 2 | — | — | — | — | — | — | — |

TABLE 2-continued

|  | Component | | | | | | | |
|---|---|---|---|---|---|---|---|---|
| Organic solvent | 2-pyrrolidone | 15 | 15 | 15 | 15 | 15 | 15 | 15 |
|  | 3-methoxy-N,N-dimethylproprionamide | — | — | — | — | — | — | — |
|  | 1,3-butanediol | 6 | 6 | 6 | 6 | 6 | 6 | 6 |
|  | 1,2-hexanediol | 6 | 6 | 6 | 6 | 6 | 6 | 6 |
| Surfactant | BYK-348 | 2 | 2 | 2 | 2 | 2 | 2 | 2 |
|  | Water | Remainder | Remainder | Remainder | Remainder | Remainder | Remainder | Remainder |
|  | Total | 100 | 100 | 100 | 100 | 100 | 100 | 100 |
|  | D50 (nm) before mixing | 152 | 166 | 165 | 170 | 167 | 165 | 121 |
|  | D50 (nm) during test liquid mixing | 1998 | 190 | 178 | 347 | 1329 | 194 | 190 |
|  | D50 increase rate (%) | 1214 | 14 | 8 | 104 | 696 | 18 | 57 |
|  | Resin parts by mass/pigment 100 parts by mass (parts by mass) | 225 | 225 | 220 | 230 | 225 | 425 | 225 |

|  |  | Ink | | | | |
|---|---|---|---|---|---|---|
|  | Component | C8 | C9 | C10 | C11 | C12 |
| Pigment | Cyan pigment 1 | — | — | — | — | — |
|  | Cyan pigment 2 | 2 | 2 | 2 | 2 | 2 |
|  | Magenta pigment | — | — | — | — | — |
|  | Yellow pigment | — | — | — | — | — |
|  | Black pigment | — | — | — | — | — |
| Resin dispersant | Water-soluble resin 1 | — | 0.6 | 0.5 | 0.5 | 0.5 |
|  | Water-soluble resin 2 | 0.6 | — | — | — | — |
| Resin particles | Resin particles 1 | — | — | — | — | — |
|  | Resin particles 2 | 4 | 4 | 4 | 4 | 4 |
| Organic solvent | 2-pyrrolidone | 15 | 15 | 15 | 5 | 10 |
|  | 3-methoxy-N,N-dimethylproprionamide | — | — | — | — | — |
|  | 1,3-butanediol | 6 | 6 | 6 | 6 | 6 |
|  | 1,2-hexanediol | 6 | 6 | 6 | 6 | 6 |
| Surfactant | BYK-348 | 2 | 2 | 2 | 2 | 2 |
|  | Water | Remainder | Remainder | Remainder | Remainder | Remainder |
|  | Total | 100 | 100 | 100 | 100 | 100 |
|  | D50 (nm) before mixing | 119 | 118 | 123 | 119 | 121 |
|  | D50 (nm) during test liquid mixing | 1852 | 1239 | 857 | 860 | 865 |
|  | D50 increase rate (%) | 1456 | 950 | 597 | 623 | 615 |
|  | Resin parts by mass/pigment 100 parts by mass (parts by mass) | 230 | 230 | 225 | 225 | 225 |

TABLE 3

|  |  | Ink | | | | | | | |
|---|---|---|---|---|---|---|---|---|---|
|  | Component | M1 | M2 | M3 | M4 | M5 | M6 | M7 | M8 |
| Pigment | Cyan pigment 1 | — | — | — | — | — | — | — | — |
|  | Cyan pigment 2 | — | — | — | — | — | — | — | — |
|  | Magenta pigment | 2 | 2 | 2 | 2 | 2 | 2 | 2 | 2 |
|  | Yellow pigment | — | — | — | — | — | — | — | — |
|  | Black pigment | — | — | — | — | — | — | — | — |
| Resin dispersant | Water-soluble resin 1 | 0.5 | 0.5 | 0.5 | 0.5 | 0.5 | 0.5 | 0.5 | 0.5 |
|  | Water-soluble resin 2 | — | — | — | — | — | — | — | — |
| Resin particles | Resin particles 1 | 4 | 6 | 2 | 8 | — | 2 | 2 | 2 |
|  | Resin particles 2 | — | — | — | — | 6 | — | — | — |
| Organic solvent | 2-pyrrolidone | 15 | 15 | 15 | 15 | 15 | 5 | 10 | — |
|  | 3-methoxy-N,N-dimethylproprionamide | — | — | — | — | — | — | — | 15 |
|  | 1,3-butanediol | 6 | 6 | 6 | 6 | 6 | 6 | 6 | 6 |
|  | 1,2-hexanediol | 6 | 6 | 6 | 6 | 6 | 6 | 6 | 6 |
| Surfactant | BYK-348 | 2 | 2 | 2 | 2 | 2 | 2 | 2 | 2 |
|  | Water | Remainder | Remainder | Remainder | Remainder | Remainder | Remainder | Remainder | Remainder |
|  | Total | 100 | 100 | 100 | 100 | 100 | 100 | 100 | 100 |
|  | D50 (nm) before mixing | 175 | 177 | 175 | 180 | 152 | 176 | 178 | 177 |
|  | D50 (nm) during test liquid mixing | 183 | 183 | 185 | 195 | 2183 | 183 | 183 | 183 |
|  | D50 increase rate (%) | 5 | 3 | 6 | 8 | 1336 | 4 | 3 | 3 |
|  | Resin parts by mass/pigment 100 parts by mass (parts by mass) | 225 | 325 | 125 | 425 | 325 | 125 | 125 | 125 |

TABLE 3-continued

|  | Component | Y1 | Y2 | Bk1 | Bk2 | Bk3 | Bk4 |
|---|---|---|---|---|---|---|---|
| Pigment | Cyan pigment 1 | — | — | — | — | — | — |
|  | Cyan pigment 2 | — | — | — | — | — | — |
|  | Magenta pigment | — | — | — | — | — | — |
|  | Yellow pigment | 2 | 2 | — | — | — | — |
|  | Black pigment | — | — | 2 | 2 | 2 | 2 |
| Resin dispersant | Water-soluble resin 1 | 0.5 | 0.5 | 0.5 | 0.5 | 0.5 | 0.5 |
|  | Water-soluble resin 2 | — | — | — | — | — | — |
| Resin particles | Resin particles 1 | 4 | 6 | 6 | 6.5 | 8 | 10 |
|  | Resin particles 2 | — | — | — | — | — | — |
| Organic solvent | 2-pyrrolidone | 15 | 15 | 15 | 15 | 15 | 15 |
|  | 3-methoxy-N,N-dimethylproprionamide | — | — | — | — | — | — |
|  | 1,3-butanediol | 6 | 6 | 6 | 6 | 6 | 6 |
|  | 1,2-hexanediol | 6 | 6 | 6 | 6 | 6 | 6 |
| Surfactant | BYK-348 | 2 | 2 | 2 | 2 | 2 | 2 |
|  | Water | Remainder | Remainder | Remainder | Remainder | Remainder | Remainder |
|  | Total | 100 | 100 | 100 | 100 | 100 | 100 |
|  | D50 (nm) before mixing | 180 | 182 | 174 | 175 | 189 | 199 |
|  | D50 (nm) during test liquid mixing | 190 | 314 | 2535 | 2535 | 2621 | 2739 |
|  | D50 increase rate (%) | 6 | 73 | 1357 | 1349 | 1287 | 1276 |
|  | Resin parts by mass/pigment 100 parts by mass (parts by mass) | 225 | 325 | 325 | 350 | 425 | 525 |

In Tables 1 to 3, the materials other than those described by the compound name are as follows.

Catiomaster PDT-2 (product name: manufactured by Yokkaichi Chemical Company, Limited, amine epichlorohydrin condensation type resin: Mw=1000)

Catiomaster PD-7 (product name: manufactured by Yokkaichi Chemical Company, Limited, amine epichlorohydrin condensation type resin: Mw=5000)

BYK-348 (product name, manufactured by BYK Japan, silicone-based surfactant)

Cyan pigment 1: C.I. Pigment Blue 15:3, volume average particle diameter 85 nm

Cyan pigment 2: C.I. Pigment Blue 15:3, volume average particle diameter 120 nm

Magenta pigment: C.I. Pigment Red 122, volume average particle diameter 122 nm

Yellow pigment: C.I. Pigment Yellow 155, volume average particle diameter 140 nm Black pigment: C.I. Pigment Black 7, volume average particle diameter 102 nm Commercially available pigments were acquired for each pigment and subjected to a classification process or the like as necessary to obtain the volume average particle diameter described above. The volume average particle diameter is measured using a water-based dispersion of the pigments. Cyan pigments having a relatively large volume average particle diameter and a relatively small volume average particle diameter were each acquired, and subjected to a classification process as necessary to obtain the volume average particle diameter described above.

Preparation of Resin Dispersant 40 parts by mass of an St-Ac acid copolymer (copolymerized at a mass ratio of methacrylic acid/butyl acrylate/styrene/hydroxyethyl acrylate=25/50/15/10, weight average molecular weight 7,000) were added to a liquid obtained by mixing 7 parts by mass of potassium hydroxide, 23 parts by mass of water, and 30 parts by mass of triethylene glycol-mono-n-butyl ether, and heated while stirring at 80° C. to prepare a resin dispersant. The type and the mass ratio of the monomers used as a basis as described above were adjusted such that a water-soluble resin 1 had an acid value of 60 mg/g KOH and a water-soluble resin 2 had an acid value of 110 mg/g KOH.

Preparation of Pigment Dispersion 20 parts by mass of a pigment, 10 parts by mass of a resin dispersant, 1,3-butanediol, and 60 parts by mass of ion exchanged water were mixed and dispersed using a zirconium bead mill to obtain pigment dispersions of each color. The resin dispersants were used after adjusting the parts by mass such that the mass ratios of the pigments and the resin dispersants in each Example in Table 2 were as in the table. In the same manner as the evaluation of the aggregation property of the resin emulsion described below, when the aggregation property of the pigment dispersion is evaluated, all of the pigment dispersions were 400% or more.

Adjustment of Resin Particles

Emulsion copolymerization was carried out with 75 parts by mass of styrene, 0.5 parts by mass of acrylic acid, 14.5 parts by mass of methyl methacrylate, and 10 parts by mass of cyclohexyl methacrylate to obtain an St-Ac resin emulsion. As a surfactant for emulsion polymerization, Newcol NT-30 (manufactured by Nippon Nyukazai Co., Ltd.) was used, and the usage amount was 2 parts by mass with the total amount of monomers as 100 parts by mass. By adjusting the kind and the mass ratio of the monomer using the above as a basic example, the acid value of resin particles 1 was adjusted to (10 mg/g KOH) and the acid value of resin particles 2 was adjusted to (20 mg/g KOH). Furthermore, in the resin particles 2, the usage amount of Newcol NT-30 was set to 0.5 parts by mass with the total amount of monomers as 100 parts by mass.

Table 2 and Table 3 describe the mass ratio of the resin (the total of the solid content of the resin dispersant and the resin emulsion) included in the ink, with respect to the pigment included in the ink. The mass ratio was calculated based on the mass as the parts by mass of the resin with respect to 100 parts by mass of the pigment.

4.2. Evaluation of Aggregation Property of Resin Emulsion

Each resin particle emulsion was diluted with pure water such that the solid content in the resin emulsion was 0.01% by mass, and was measured three times with the Nanotrac UPA-150 (Nikkiso Co., Ltd.) to obtain an average value, and the volume average particle diameter (D50) each of the resin particles were determined. In addition, each resin particle emulsion and a test liquid (5% by mass water-based solution of magnesium sulfate heptahydrate) were mixed such that the resin solid content in the resin emulsion and the aggregating agent solid content in the treatment liquid had a ratio of 4:1, stirred slowly at room temperature for 10 minutes, left to stand for one hour, and then diluted with pure water such that the total solid content was 0.01%, the mixture was measured three times with the Nanotrac UPA-150 (manufactured by Nikkiso Co., Ltd.) to obtain an average value, and the volume average particle diameter (D50) of the resin particles after aggregation was determined.

As a result, the resin particles 1 had an initial D50 of 204 nm and a D50 of 211 nm when mixing the test liquid, and the change rate of the average particle diameter was (211−204)/204×100=3.4(%). In the resin particles 2, the initial D50 was 112 nm and the D50 during mixing of the test liquid was 914 nm, and the change rate of the average particle diameter was (914−112)/112×100=716(%). Measurement was carried out in the same manner using the treatment liquids R1 to R4 in place of the test liquid, and the same results were obtained.

4.3. Evaluation of Aggregation Property of Ink

Each ink (cyan inks (C1 to C12), magenta inks (M1 to M8), yellow inks (Y1 to Y2), and black inks (Bk1 to Bk4)) and the test liquid (5% by mass water-based solution of magnesium sulfate heptahydrate) were mixed at a ratio such that the ratio of the resin solid content in the ink and the solid content of the aggregating agent in the treatment liquid was 4:1, stirred slowly at room temperature for 10 minutes, and left to stand for one hour, then diluted with pure water such that the total solid content was 0.01%, the mixture was measured three times with the Nanotrac UPA-150 (manufactured by Nikkiso Co., Ltd.) to obtain an average value, and the volume average particle diameters (D50) of the ink components after aggregation were respectively determined. The results are shown in Tables 2 and 3. In each of the inks, the D50 before mixing was 100 to 200 nm, and the D50 increased compared with that before mixing due to the mixing with the test liquid and the treatment liquid.

4.4. Recording Test

As a recording apparatus, a remodeled machine of an ink jet printer (product name: PX-G 930, manufactured by Seiko Epson Corp.) provided with an ink jet head with an attached platen heater capable of varying the temperature on the paper guide portion was used. One by one, the nozzle rows were filled with treatment liquid (SH), and inks of cyan (C), magenta (M), yellow (Y), and black (Bk).

Mactac 5829R manufactured by Mactac was used as a recording medium. First, a solid pattern of a reaction solution was formed on the recording medium, with an attachment amount of 1.2 mg/inch$^2$ and a resolution of a 720 dpi in length×720 dpi in width.

During this printing, the surface temperature of the recording medium was set to 35° C. Thereafter, the paper was passed therethrough again and a solid pattern was printed thereon in which the first ink and the second ink were printed at different positions at the same position as the reaction solution. The solid pattern of the color ink was set to have a landing amount of 12 mg/inch$^2$ such that the resolution was 1440 dpi in length×720 dpi in width. The surface temperature of the recording medium was also set to 35° C. in this printing.

After printing the color ink, the recording medium discharged from the recording apparatus was dried in an oven at 100° C. for 2 minutes. Table 4 and Table 5 show the first ink, second ink, and treatment liquid used in each Example.

TABLE 4

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| First ink | | C2 | C3 | C2 | C1 | C6 | C2 | C2 | C2 | C8 | C2 | C2 | C2 | C11 | C12 | C2 |
| Second ink | | M2 | M2 | Y2 | Bk1 | M3 | M3 | M1 | M4 | M5 | M2 | M2 | M2 | M6 | M7 | M8 |
| Treatment liquid | | R1 | R1 | R1 | R1 | R1 | R1 | R1 | R1 | R1 | R2 | R3 | R4 | R1 | R1 | R1 |
| Ink characteristics | | | | | | | | | | | | | | | | |
| D50 (nm) | First ink | 190 | 178 | 190 | 1998 | 194 | 190 | 190 | 190 | 1852 | 190 | 190 | 190 | 190 | 190 | 190 |
| during mixing | Second ink | 183 | 183 | 314 | 2535 | 185 | 183 | 181 | 195 | 2183 | 183 | 183 | 183 | 183 | 183 | 183 |
| of test liquid | Difference | 4% | 3% | 39% | 21% | 5% | 4% | 5% | 3% | 15% | 4% | 4% | 4% | 4% | 4% | 4% |
| Resin parts by | First ink | 225 | 220 | 225 | 225 | 425 | 225 | 225 | 225 | 230 | 225 | 225 | 225 | 225 | 225 | 225 |
| mass/pigment 100 | Second ink | 325 | 325 | 325 | 325 | 125 | 125 | 225 | 425 | 325 | 325 | 325 | 325 | 325 | 325 | 325 |
| parts by mass (parts by mass) | | | | | | | | | | | | | | | | |
| D50 (nm) | First ink | 190 | 178 | 190 | 1998 | 194 | 190 | 190 | 190 | 1852 | 187 | 191 | 204 | 190 | 190 | 190 |
| during mixing | Second ink | 183 | 183 | 314 | 2535 | 185 | 185 | 181 | 195 | 2183 | 203 | 202 | 209 | 183 | 183 | 183 |
| of treatment liquid | Difference | 4% | 3% | 39% | 21% | 5% | 3% | 5% | 3% | 15% | 8% | 5% | 2% | 4% | 4% | 4% |
| Evaluation | | | | | | | | | | | | | | | | |
| First ink | Gloss | A | A | A | B | A | A | A | A | B | A | A | C | A | A | A |
| | OD value | A | A | A | A | C | A | A | A | A | A | A | A | A | A | A |
| | Clogging | A | A | A | A | A | A | A | A | A | A | A | A | A | A | A |
| Second ink | Gloss | A | A | B | C | B | B | A | C | A | A | A | C | A | A | A |
| | OD value | A | A | A | A | A | A | A | A | A | A | A | A | A | A | A |
| | Clogging | A | A | A | A | A | A | B | A | A | A | A | A | A | A | A |
| Gloss difference between inks | | A | A | B | A | B | B | A | A | A | A | A | B | B | A | A |

TABLE 5

|  |  | Comparative Example | | | | | | | | | | Reference Example | | |
|---|---|---|---|---|---|---|---|---|---|---|---|---|---|---|
|  |  | 1 | 2 | 3 | 4 | 5 | 6 | 7 | 8 | 9 | 10 | 1 | 2 | 3 |
| First ink | | C1 | C4 | C5 | M1 | Y1 | C2 | C2 | C7 | C9 | C10 | C1 | C2 | C2 |
| Second ink | | M2 | M2 | M2 | Y2 | Bk 1 | Bk2 | Bk3 | M2 | M5 | M5 | M2 | M2 | Bk4 |
| Treatment liquid | | R1 | R1 | R1 | R1 | R1 | R1 | R1 | R1 | R1 | R1 | — | — | R1 |
| Ink characteristics | | | | | | | | | | | | | | |
| D50 (nm) during mixing of test liquid | First ink | 1998 | 347 | 1329 | 183 | 190 | 190 | 190 | 190 | 1239 | 857 | 1998 | 190 | 190 |
|  | Second ink | 183 | 183 | 183 | 314 | 2535 | 2535 | 2621 | 183 | 2183 | 2183 | 183 | 183 | 2739 |
|  | Difference | 91% | 47% | 86% | 42% | 93% | 93% | 93% | 4% | 43% | 61% | 91% | 4% | 93% |
| Resin parts by mass/pigment 100 parts by mass (parts by mass) | First ink | 225 | 230 | 225 | 225 | 225 | 225 | 225 | 225 | 230 | 225 | 225 | 225 | 225 |
|  | Second ink | 325 | 325 | 325 | 325 | 325 | 350 | 425 | 325 | 325 | 325 | 325 | 325 | 525 |
| D50 (nm) during mixing of treatment liquid | First ink | 1998 | 347 | 1329 | 183 | 190 | 190 | 190 | 190 | 1239 | 857 | — | — | 190 |
|  | Second ink | 183 | 183 | 183 | 314 | 2535 | 2535 | 2621 | 183 | 2183 | 2183 | — | — | 2739 |
|  | Difference | 91% | 47% | 86% | 42% | 93% | 93% | 93% | 4% | 43% | 61% | — | — | 93% |
| Evaluation | | | | | | | | | | | | | | |
| First ink | Gloss | B | B | B | A | A | A | A | C | B | B | A | A | A |
|  | OD value | A | A | A | A | A | A | A | B | A | A | B | B | A |
|  | Clogging | A | A | A | A | A | A | A | A | A | A | A | A | A |
| Second ink | Gloss | A | A | A | B | C | C | B | A | C | C | A | A | B |
|  | OD value | A | A | A | A | A | A | A | A | A | A | B | B | A |
|  | Clogging | A | A | A | A | A | A | B | A | A | A | A | A | C |
| Gloss difference between inks | | C | C | C | C | C | C | C | C | C | C | A | A | B |

4.5. Evaluation of Gloss

With respect to the obtained pattern, the gloss at a tilting angle of 60° was measured using a gloss meter (manufactured by Konica Minolta, Inc.). The evaluation criteria are shown below. The evaluation results are shown in Table 4 and Table 5.

Evaluation Criteria
- A: 50 or more and less than 80
- B: 20 or more and less than 50
- C: Less than 20

4.6. Evaluation of OD Value

With respect to the obtained pattern, the OD value was measured using a Gretag Macbeth colorimeter. The measurement conditions were reflection, D50 light source, field of view 2°, DIN NB, and no filter. The evaluation criteria are shown below. The evaluation results are shown in Table 4 and Table 5.
- A: 1.0 or more
- C: Less than 1.0

4.7. Evaluation of Clogging (Continuous Ejection Stability)

Continuous recording was performed in an environment at a temperature of 25° C. and a relative humidity of 20% in the same manner as in the above recording test. After completion, an ejection stability test was performed. During recording, in the nozzle row, nozzles not used for recording (no ink was ejected) were provided as a half of the number of all nozzles in the nozzle row. In addition, 180 nozzles were used for one nozzle row. For nozzles not used for recording, flushing was carried out with a flushing box every time one pass was completed.

In addition, suction cleaning was not performed during recording. Such recording was performed continuously for 2 hours. After completion of the recording, suction cleaning of the nozzle row was performed for the 90 nozzles described above and 3 mL of ink per nozzle row was suctioned and discharged. Thereafter, the continuous ejection stability was evaluated according to the following evaluation criteria. The evaluation results are shown in Table 4 and Table 5.

Evaluation Criteria
- A: All the nozzles were recovered by one suction cleaning. Alternatively, there were no defective nozzles.
- B: Although not all the nozzles were recovered by one cleaning, all of the nozzles were recovered by suction cleaning 3 times or less.
- C: Not all the nozzles were recovered after three suction cleanings.

4.8. Difference in Gloss Between Colors

Evaluation of the glossiness obtained by the above method was carried out based on the difference between the two colors. The evaluation criteria are shown below. The evaluation results are shown in Table 4 and Table 5.

Evaluation Criteria
- A: The difference is 0 or more and less than 15
- B: The difference is 15 or more and less than 25
- C: The difference is 25 or more

4.9. Evaluation Results

From the above example, the following was found.

In a case where each of the first ink and the second ink are mixed with a 5% by mass water-based solution of magnesium sulfate heptahydrate including resin particles, it was found that the Examples in which the difference between the D50 average particle diameters of both were 40% or less were excellent in reducing the gloss difference between the inks, and images with fewer perceived flaws were formed. In contrast, in all of the Comparative Examples which did not have such a difference, the reduction in gloss difference was inferior. The details will be described below.

From a comparison of the second inks of Examples 5 and 6 and 1, 7, and 8, it was found that when the content of the resin is small with respect to 100 parts by mass of the pigment included in the ink, the gloss decreases.

From a comparison of Examples 10 to 12 and 1, the effect of reducing the gloss difference was similarly obtained even in a case where the treatment liquids R2 to R4 were used. The difference between D50 of the first ink and the second ink in a case of using the test liquid is not significantly different from the difference of D50 in a case of using the treatment liquid, and it was found that either may be used in terms of confirming the difference in D50 between the first ink and the second ink.

From a comparison of the second inks of Examples 9 and 1, it was found that the gloss decreases in a case of using resin in which the resin particles had a high degree of aggregation. Also, in this case, it was possible to reduce the gloss difference by setting the gloss of the first ink and the second ink to be close to each other. There are also cases where it is more preferable to reduce the difference in gloss in a state of high gloss, such as in a case of considering the gloss difference with the recording medium.

From a comparison of the second inks of Examples 13 to 15 and 6 and a comparison of the first inks of Examples 13 to 15 and Comparative Example 10, the gloss increased as the content of the nitrogen-containing solvent included in the ink was greater. In addition, the gloss was also higher depending on the type of the nitrogen-containing solvent. Also, in these cases, it was possible to reduce gloss differences by making the gloss of the first ink and the second ink close.

In each of Comparative Examples 1 to 7, 9 and 10, it was found that, for all the differences in glossiness between inks, in a case of being mixed with a 5% by mass water-based solution of magnesium sulfate heptahydrate, the difference between the D50 average particle diameters of both exceeded 40% and an image having a large gloss differences and perceived flaws was formed.

In Comparative Example 8, an ink including no resin particles (the first ink (C7)) was used, and it was found that there was a large gloss difference between the inks and an image having perceived flaws was formed.

In Reference Examples 1 and 2, a treatment liquid was not used (not used with the treatment liquid), but the gloss difference was small and good. This is considered to be due to the fact that aggregation of the components of the ink does not occur, and the coloring property was decreased. In Reference Examples 1 and 2, fine tone unevenness due to ink bleeding was observed in the image, and the image quality was inferior. From this, it was found that the invention is useful in that it is possible to reduce gloss differences in a case of obtaining an excellent image quality using a treatment liquid.

In Reference Example 3, the D50 difference between the inks was large, but the gloss difference was relatively small. The content of the resin of the second ink was large, but since it is possible to smooth the resin by the post-heating step in a case where the content of the resin is large, it may be possible to reduce the gloss difference by increasing the gloss. However, in a case where the resin content is high, the clogging resistance may be inferior in some cases. It was found that the invention is particularly useful in that it is possible to reduce the gloss difference without excessively increasing the resin content of the ink.

Although not described in the Tables, when recording was performed with three ink sets using C2, M2, Y2, and R1, it was confirmed that the difference in D50 after mixing the test liquid and after mixing with the treatment liquid in all of the inks was 40% or less and the evaluation of the gloss difference was B.

In addition, when recording was performed with four ink sets using C2, M2, Y2, Bk4, and R1, the difference in D50 after mixing the test liquid and after mixing the treatment liquid was 40% or less. The evaluation of gloss difference was B. In both the case of three inks and the case of four inks, the reduction in gloss difference was excellent.

The invention is not limited to the above-described embodiments, and various modifications thereto are possible. For example, the invention includes configurations substantially the same as the configuration described in the embodiment (for example, a configuration having the same function, a method and a result, or a configuration having the same object and effect). In addition, the invention includes a configuration in which non-essential parts of the configuration described in the embodiment are replaced. In addition, the invention includes a configuration which achieves the same operation and effect as the configuration described in the embodiment, or a configuration which is able to achieve the same object. In addition, the invention includes a configuration in which a known technique is added to the configuration described in the embodiment.

The entire disclosure of Japanese Patent Application No. 2018-056403, filed Mar. 23, 2018 is expressly incorporated by reference herein.

What is claimed is:

1. An ink set comprising:
   a first ink and a second ink which are water-based ink compositions,
   wherein the first ink and the second ink contain a pigment and resin particles,
   the first ink contains a first pigment and the second ink contains a second pigment different from the first pigment such that the first ink and the second ink have a different color from each other,
   when the first ink and the second ink are respectively mixed with a 5% by mass water-based solution of magnesium sulfate heptahydrate, a volume average particle diameter of each of the first ink and the second ink increases, and a difference in the volume average particle diameter between the first ink and the second ink after mixing is 40% or less, and
   the ink set is used for recording together with a treatment liquid including an aggregating agent for aggregating the components of the water-based ink compositions.

2. The ink set according to claim 1, wherein the first ink includes 150 parts by mass or more of resin including the resin particles with respect to 100 parts by mass of the first pigment and the second ink includes 150 parts by mass or more of resin including the resin particles with respect to 100 parts by mass of the second pigment.

3. The ink set according to claim 1, further comprising:
   a third ink which is a water-based ink composition including a third pigment which is a pigment different from the first pigment and the second pigment, and resin particles,
   wherein when the first ink, the second ink, and third ink are each respectively mixed with a 5% by mass water-based solution of magnesium sulfate heptahydrate, a volume average particle diameter of each of the first ink, the second ink, and the third ink increases, and a difference in the volume average particle diameter between each of the first ink, the second ink, and the third ink, respectively, after mixing is 40% or less.

4. The ink set according to claim 1,
   wherein when the resin particles contained in the first ink and the resin particles contained in the second ink are mixed with a 5% by mass water-based solution of magnesium sulfate heptahydrate, a volume average particle diameter of the resin particles of each of the first ink and the second ink increases 400% or less.

5. The ink set according to claim 1,
   wherein a content of the pigment in each of the first ink and the second ink is 1% by mass or more.

6. The ink set according to claim 1,
wherein the treatment liquid includes, as an aggregating agent, one or more types of a polyvalent metal salt, a cationic resin, and an organic acid.

7. The ink set according to claim 1,
wherein the first ink and the second ink each include a nitrogen-containing solvent.

8. The ink set according to claim 1, wherein a content of the first pigment is 0.5 to 5% by mass with respect to a total mass of the first ink, and a content of the second pigment is 0.5 to 5% by mass with respect to a total mass of the second ink.

9. The ink set according to claim 1, wherein the first ink includes 150 to 500 parts by mass of resin including the resin particles with respect to 100 parts by mass of the first pigment, and the second ink includes 150 to 500 parts by mass of resin including the resin particles with respect to 100 parts by mass of the second pigment.

10. The ink set according to claim 1, wherein a content of the resin particles contained in the first ink is 1 to 15% by mass with respect to a total mass of the first ink, and a content of the resin particles contained in the second ink is 1 to 15% by mass with respect to a total mass of the second ink.

11. The ink set according to claim 1, wherein the resin particles contained in the first ink and the resin particles contained in the second ink each have a volume average particle diameter of 10 to 300 nm.

12. The ink set according to claim 1, wherein the first pigment and the second pigment each have a volume average particle diameter of 10 to 200 nm.

13. The ink set according to claim 1, wherein each of the first ink and the second ink are an ink jet ink.

14. The ink set according to claim 1, wherein the ink set is configured to be used for recording on a recording medium that is a low-absorption or a non-absorption recording medium.

* * * * *